US011354449B2

(12) United States Patent
Kaminski

(10) Patent No.: US 11,354,449 B2
(45) Date of Patent: Jun. 7, 2022

(54) SECURE INITIAL PROVISIONING OF A SYSTEM ON A CHIP

(71) Applicant: TESLA, INC., Palo Alto, CA (US)

(72) Inventor: Patryk Kaminski, Austin, TX (US)

(73) Assignee: Tesla, Inc., Austin, TX (US)

( * ) Notice: Subject to any disclaimer, the term of this patent is extended or adjusted under 35 U.S.C. 154(b) by 192 days.

(21) Appl. No.: 16/388,408

(22) Filed: Apr. 18, 2019

(65) Prior Publication Data

US 2019/0332815 A1    Oct. 31, 2019

Related U.S. Application Data

(60) Provisional application No. 62/663,429, filed on Apr. 27, 2018.

(51) Int. Cl.
| | |
|---|---|
| *G06F 21/71* | (2013.01) |
| *H04L 9/08* | (2006.01) |
| *H04L 9/06* | (2006.01) |
| *H04L 9/30* | (2006.01) |
| *G06F 21/76* | (2013.01) |

(52) U.S. Cl.
CPC ............ *G06F 21/71* (2013.01); *H04L 9/0631* (2013.01); *H04L 9/085* (2013.01); *H04L 9/0894* (2013.01); *H04L 9/30* (2013.01); *G06F 21/76* (2013.01)

(58) Field of Classification Search
CPC ....... G06F 21/71; G06F 21/76; H04L 9/0631; H04L 9/085; H04L 9/0894; H04L 9/30
USPC ......................................................... 713/189
See application file for complete search history.

(56) References Cited

U.S. PATENT DOCUMENTS

| | | | |
|---|---|---|---|
| 8,843,706 | B2 | 9/2014 | Heil et al. |
| 2004/0006584 | A1 | 1/2004 | Vandeweerd |
| 2005/0172105 | A1 | 8/2005 | Doering et al. |
| 2009/0070728 | A1 | 3/2009 | Solomon |
| 2009/0271597 | A1 | 10/2009 | Kuesel et al. |
| 2010/0169857 | A1 | 7/2010 | Campi et al. |
| 2010/0284539 | A1* | 11/2010 | Roy ................. H03K 19/17768 380/278 |

(Continued)

OTHER PUBLICATIONS

Scicari,"Security, privacy and trust in Internet of Things: The road ahead", 2015, Computer Networks, pp. 146-164 (Year: 2015).*

(Continued)

*Primary Examiner* — Taghi T Arani
*Assistant Examiner* — Gregory A Lane
(74) *Attorney, Agent, or Firm* — Knobbe, Martens, Olson & Bear, LLP

(57) ABSTRACT

Securely provisioning a System on a Chip (SoC) includes generating a public/private key pair having a public key and a private key, securely storing the private key external to the SoC, embedding the public key in Resistor Transistor Logic (RTL) of the SoC during manufacture of the SoC, encrypting provisioning data using the private key to create encrypted provisioning data, and programming the SoC using the encrypted provisioning data. The secure provisioning may further include generating a secret shared key, embedding the secret shared key in the RTL of the SoC during manufacture of the SoC, and encrypting the provisioning data using the secret shared key. The RTL may be the boot Read Only Memory (ROM) of the SoC. The secure provisioning technique may also be used for subsequent provisioning after the SoC is deployed.

19 Claims, 18 Drawing Sheets

(56) References Cited

U.S. PATENT DOCUMENTS

| | | |
|---|---|---|
| 2012/0066545 A1 | 3/2012 | Abe |
| 2014/0068246 A1* | 3/2014 | Hartley .................... G09C 1/00 713/155 |
| 2014/0093074 A1* | 4/2014 | Gotze ................... H04L 9/3278 380/45 |
| 2015/0358158 A1* | 12/2015 | Fadaie ................. H04L 67/104 713/171 |
| 2016/0063164 A1 | 3/2016 | Brillu et al. |
| 2017/0060204 A1 | 3/2017 | Gangwar et al. |
| 2017/0207998 A1 | 7/2017 | Fraisse |
| 2017/0223030 A1 | 8/2017 | Merza |
| 2018/0084181 A1 | 3/2018 | Sachs et al. |
| 2018/0365069 A1* | 12/2018 | Nemiroff .............. H04L 9/0894 |
| 2018/0370540 A1 | 12/2018 | Yousuf et al. |
| 2019/0158293 A1* | 5/2019 | Chen .................. G06Q 20/3829 |
| 2019/0243961 A1 | 8/2019 | Ollivier |
| 2019/0303328 A1 | 10/2019 | Balski et al. |

OTHER PUBLICATIONS

Sicari, "Security, privacy and trust in Internet of Things: The road ahead",2015, Computer Networks, pp. 146-164 (Year: 2015).*

* cited by examiner

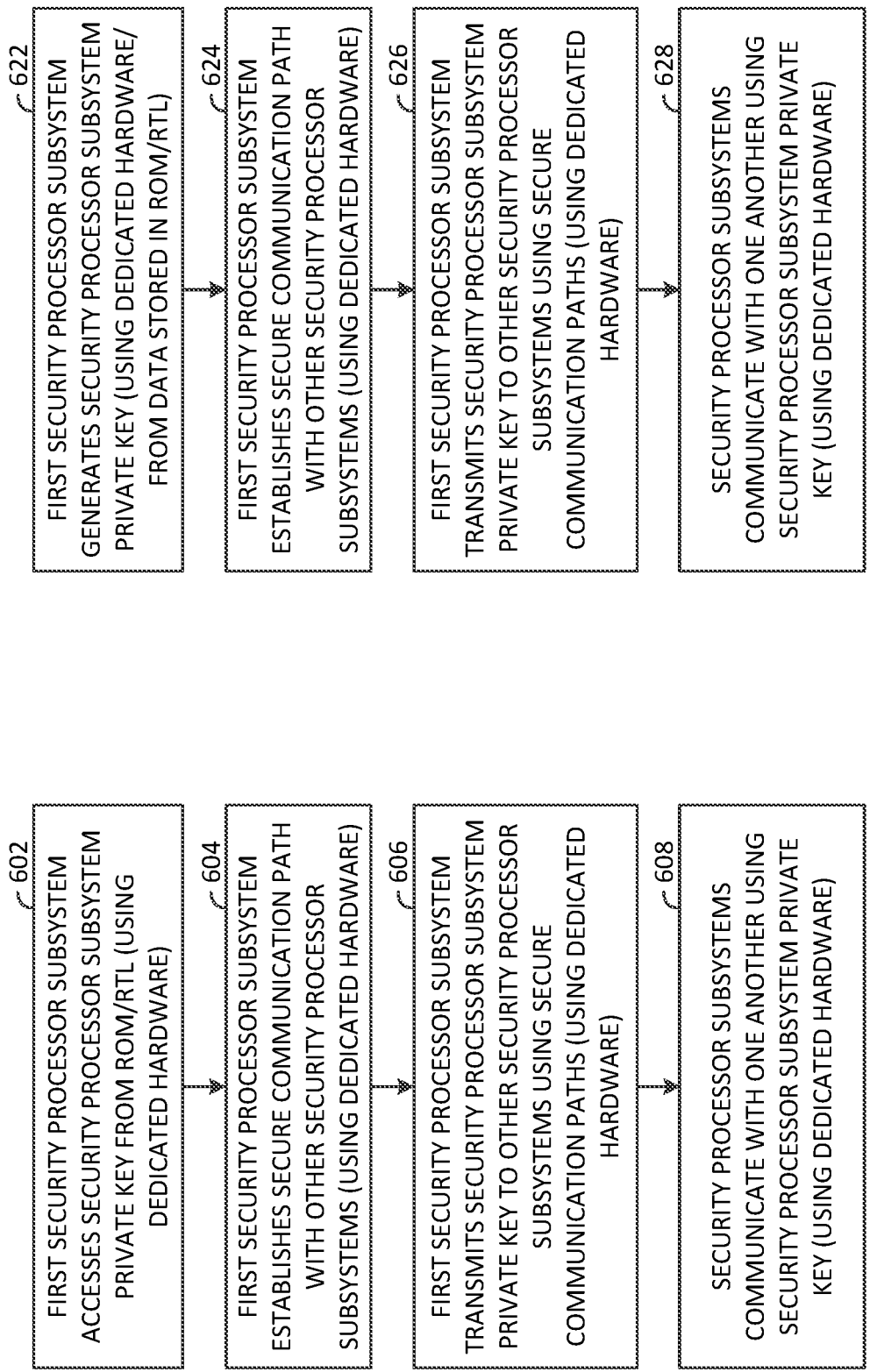

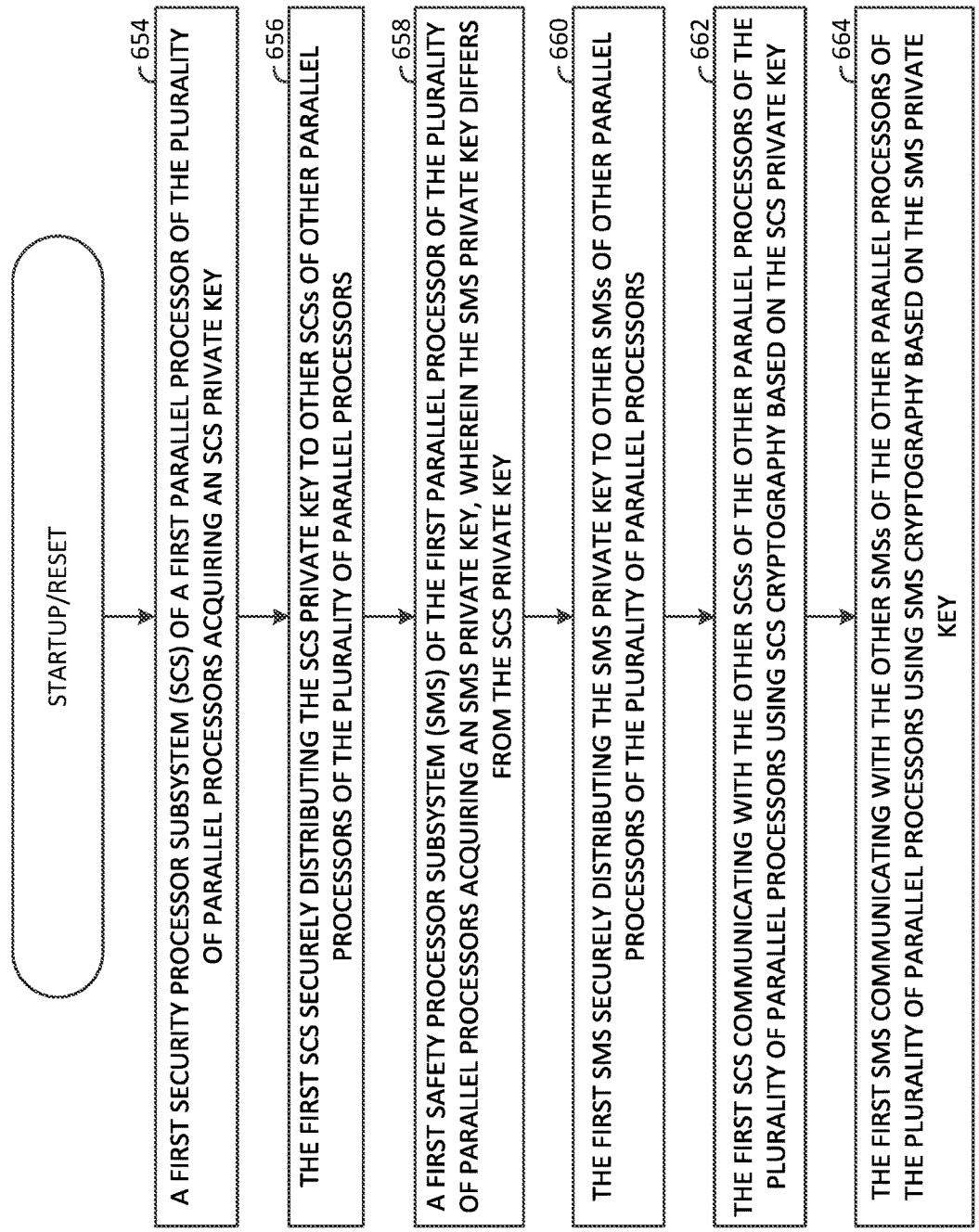

SECURE INITIAL PROVISIONING OF A SYSTEM ON A CHIP

CROSS-REFERENCE TO RELATED APPLICATIONS

The present U.S. Utility Patent Application claims priority pursuant to 35 U.S.C. § 119(e) to U.S. Provisional Application No. 62/663,429, entitled "SECURE INITIAL PROVISIONING OF A SYSTEM ON A CHIP", filed Apr. 27, 2018, which is hereby incorporated herein by reference in its entirety and made part of the present U.S. Utility Patent Application for all purposes.

BACKGROUND

Technical Field

The present disclosure relates to a System on Chip; and more particularly to the initial provisioning of a System on a Chip.

Description of Related Art

A system on a Chip (SoC) includes a plurality of processing systems arranged on a single integrated circuit. Each of these separate processing systems typically performs a corresponding set of processing functions. The separate processing systems typically interconnect via one or more communication bus structures. Some SoCs are deployed within systems that have high security requirements, e.g., financial processing systems, autonomous driving systems, medical processing systems, and air traffic control systems, among others. With these systems, multiple SoCs may operate in parallel on common input data to enhance system reliability.

After manufacture of the SoCs and prior to operation of a system that include the SoCs, the SoCs must be provisioned. Provisioning is typically performed after the SoCs are installed on a Printed Circuit Board (PCB) and/or after installation of the SoCs in a larger system. After manufacture and prior to provisioning, the SoCs are susceptible to malicious attack, which may include loading of malware on the SoCs or otherwise taking steps that would cause the SoCs to malfunction when installed within the larger system. The malfunction of an autonomous driving system, a medical processing system, a traffic control system, or a financial processing system is very undesirable.

SUMMARY

In order to overcome the above-described shortcomings among other shortcomings, embodiments of the present disclosure support the secure initial provisioning of an SoC. According to a first embodiment of the present disclosure, securely provisioning a SoC includes generating a public/private key pair having a public key and a private key, securely storing the private key external to an SoC, embedding the public key in Resistor Transistor Logic (RTL) of the SoC during manufacture of the SoC, encrypting provisioning data using the private key to create encrypted provisioning data, and programming the SoC using the encrypted provisioning data. Programming the SoC using the encrypted provisioning data may include transmitting the encrypted provisioning data to a security processor subsystem (SCS) or a safety processor subsystem (SMS) of the SoC. Interface with the SoC to download the encrypted provisioning data and subsequently communicating with the SoC may be performed by a provisioning station.

A first optional aspect of the first embodiment includes generating a secret shared key, embedding the secret shared key in the RTL of the SoC during manufacture of the SoC, and encrypting the provisioning data using the secret shared key. This optional aspect may further include receiving an encrypted communication from the SoC and using the secret shared key to decrypt the encrypted communication.

A second embodiment of the present disclosure also addresses the secure initial provisioning of SoC using similar operations to those of the first embodiment to provide similar benefits. The second embodiment includes generating a secret shared key, securely storing the secret shared key external to an SoC, embedding the secret shared key in RTL of the SoC during manufacture of the SoC, encrypting provisioning data using the secret shared key to create encrypted provisioning data, and programming the SoC using the encrypted provisioning data. Programming the SoC using the encrypted provisioning data may include transmitting the encrypted provisioning data to a security processor subsystem (SCS) or a safety processor subsystem (SMS) of the SoC. Operations of the second embodiment may further include receiving an encrypted communication from the SoC and using the secret shared key to decrypt the encrypted communication. Interface with the SoC to download the encrypted provisioning data and subsequently communicating with the SoC may be performed by a provisioning station.

A third embodiment of the present disclosure considers operations of a SoC during initial provisioning. The third embodiment includes receiving, by the SoC, encrypted provisioning data, accessing, by the SoC, a public key from Resistor Transistor Logic (RTL) of the SoC, and decrypting the encrypted provisioning data using the public key to create decrypted provisioning data. The SoC may then configure itself using the decrypted provisioning data.

A first optional aspect of the third embodiment includes accessing, by the SoC, a secret shared key from the RTL of the SoC and decrypting, by the SoC, the encrypted provisioning data further using the secret shared key. With this first optional aspect, operations may include encrypting, by the SoC, a message using the secret shared key to create an encrypted message and transmitting, by the SoC, the encrypted message. Decrypting the encrypted provisioning data using the public key to create the decrypted provisioning data may be performed by a SCS or SMS of the SoC.

A fourth embodiment of the present disclosure also considers operations of a SoC during initial provisioning. The fourth embodiment includes receiving, by an SoC, encrypted provisioning data, accessing, by the SoC, a secret shared key from Resistor Transistor Logic (RTL) of the SoC, and decrypting the encrypted provisioning data using the secret shared key to create decrypted provisioning data. The SoC may then initially provision itself using the decrypted provisioning data.

With a first optional aspect, operations may include encrypting, by the SoC, a message using the secret shared key to create an encrypted message and transmitting, by the SoC, the encrypted message. Decrypting the encrypted provisioning data using the secret shared key to create the decrypted provisioning data may be performed by a SCS or SMS of the SoC.

The first through fourth embodiments of the present disclosure and subsequently described embodiments provide important benefits and advantages. The SoC is resistant to unauthorized malware attack and/or unauthorized user provisioning between the time of manufacture of the SoC and the deployment of the SoC. Such is the case because such in-the-middle attackers cannot provision the SoC to load thereon offending code without access to the public/private key pair and/or the secret shared key. The technique of the first embodiment may be employed even after the SoC is deployed in the field and may be used to update firmware of the SoC. Further benefits will become apparent based upon the further disclosure provided herein.

A SoC that supports the third and fourth embodiments includes a plurality of processors, memory, and communication circuitry and a SCS. With this SoC, the SCS may be configured to perform the operations of the third and fourth embodiments. Alternately, an SMS of the SoC may perform the operations of the third and fourth embodiments. In other embodiments of the SoC, one or more general purpose processors may perform the operations of the third and fourth embodiments.

Benefits of the disclosed embodiments will become apparent from reading the detailed description below with reference to the drawings.

BRIEF DESCRIPTION OF THE SEVERAL VIEWS OF THE DRAWINGS

FIG. 6A is a flow diagram illustrating operations of an autonomous driving controller to establish secure communications among a plurality of Security Processor Subsystems (SCSs) according to one or more described embodiments.

FIG. 6B is a flow diagram illustrating differing operations of an autonomous driving controller to establish secure communications among a plurality of SCSs according to one or more described embodiments.

FIG. 6C is a flow diagram illustrating operations of an autonomous driving controller to establish secure communications among a plurality of SCSs and among a plurality of Safety Processor Subsystems (SMSs) according to one or more described embodiments.

DETAILED DESCRIPTION OF THE DISCLOSURE

Described herein are operations and structures for securely provisioning a System on a Chip (SoC). These structures and operations will be described herein with reference to SoCs that are used in autonomous driving systems, financial services systems, air traffic control systems, and medical processing systems. The teachings of the present disclosure may be applied to SoCs that are used in other types of systems as well, the teachings are not limited to the SoCs described herein, and the teachings may be applied to SoCs of many differing types of systems. Nonetheless, the embodiments described herein will frequently relate to autonomous driving systems. The reader will appreciate that the teachings of the present disclosure could be applied to many other systems in which the secure provisioning of SoCs is beneficial.

Figure 1A:
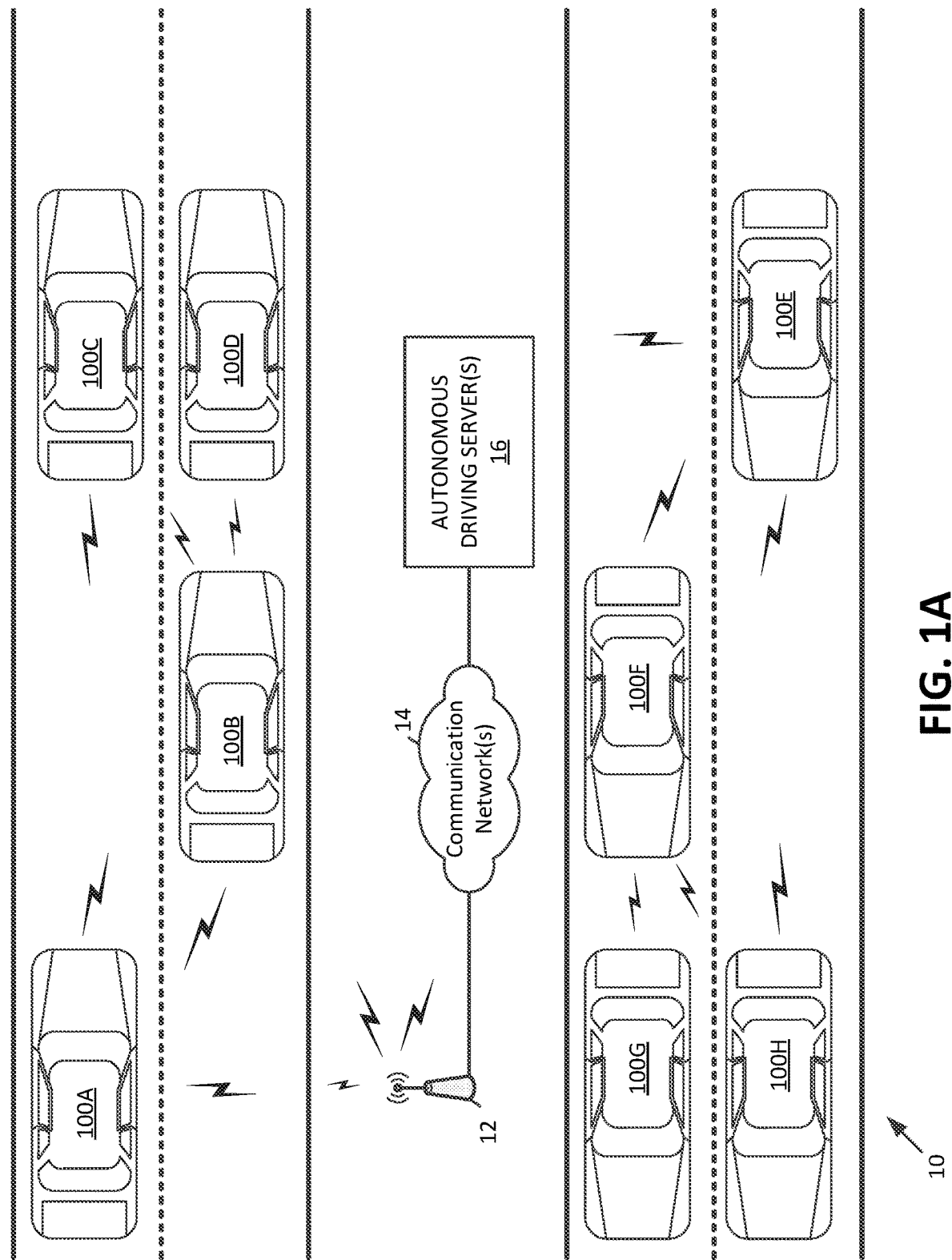
FIG. 1A is a diagram illustrating a group of vehicles, at least one of which is constructed and operates according to a described embodiment to support autonomous driving.

FIG. 1A is a diagram illustrating a group of vehicles, at least one of which is constructed and operates according to a described embodiment to support autonomous driving. Vehicles 100A-110D are traveling in a first direction and vehicles 100E-110H are traveling in a second direction. At least some of these vehicles 100A-100H support autonomous driving according to one or more embodiments described subsequently herein. The vehicles 100A-100H support intra-vehicular communications, extra-vehicular communications, and inter-vehicular communications. Intra-vehicular communications occur within a particular vehicle. Extra-vehicular communications occur between a vehicle and one or more devices external to the vehicle, e.g., between vehicle 100A and wireless access point 12, e.g., cellular base station, WiFi access point, or another wireless device. An example of such extra-vehicular communications is those between the vehicle 100A and an autonomous driving server 16 via communication network 14. These communications may relate to current autonomous driving data/situations or may include data gathered by the vehicle 100A for subsequent use by the autonomous driving server 16.

Inter-vehicular communications are a sub-set of extra-vehicular communications and are communications between two or more vehicles, e.g., 100A, 100B, 100C and 100F. These communications may relate to autonomous driving, e.g., identifying other vehicle, data exchange, vehicle driving warnings, etc. The inter-vehicular communications may be direct communications between vehicles, e.g., between vehicles 100A and 100C, or indirect communications that are relayed by wireless access point 12, either directly or via the communication network 14, the autonomous driving server, or another server. Because the vehicles 100A-110H support a wide variety of operations, they are potentially susceptible to unwanted and undesirable communications. In a particularly bad scenario, while a vehicle, e.g., 100F, is driving autonomously, it may receive a malicious communication from another vehicle, e.g., 100E or via the wireless access point 12, falsely notifying the vehicle 100F of an impending crash or other autonomous driving event. In response to this malicious communication, the vehicle 100E may automatically take a defensive maneuver that does cause a crash or near crash. Of course, this type of event is very undesirable. While it is desirable, from an autonomous driving standpoint, to receive as much input data as possible to make good autonomous driving decisions, there must be a safeguard in place to protect the vehicle 100E from malicious communications.

Thus, according to the present disclosure, a vehicle, e.g., 100E, includes an autonomous driving controller having a plurality of parallel processors that operate in parallel on common input data received from a plurality of autonomous driving sensors. Each of the plurality of parallel processors includes a general processor and a security processor subsystem (SCS), and communication circuitry configured to support communications between the plurality of parallel processors, including communications between the general processors of the plurality of parallel processors and communications between the SCSs of the plurality of parallel processors that are protected by SCS cryptography. Each of the plurality of parallel processors may each also include a safety processor subsystem (SMS), with the communication circuitry also configured to support communications between the SMSs of the plurality of parallel processors that are protected by SMS cryptography that differs from the SCS cryptography. This communication cryptography supported by the SCS, the SMS, and the communication circuitry resists malicious communications that would otherwise compromise the autonomous driving system. The autonomous driving controller may include dedicated hardware and/or storage of the SCS and/or SMS to service the communication cryptography.

Figure 1B:
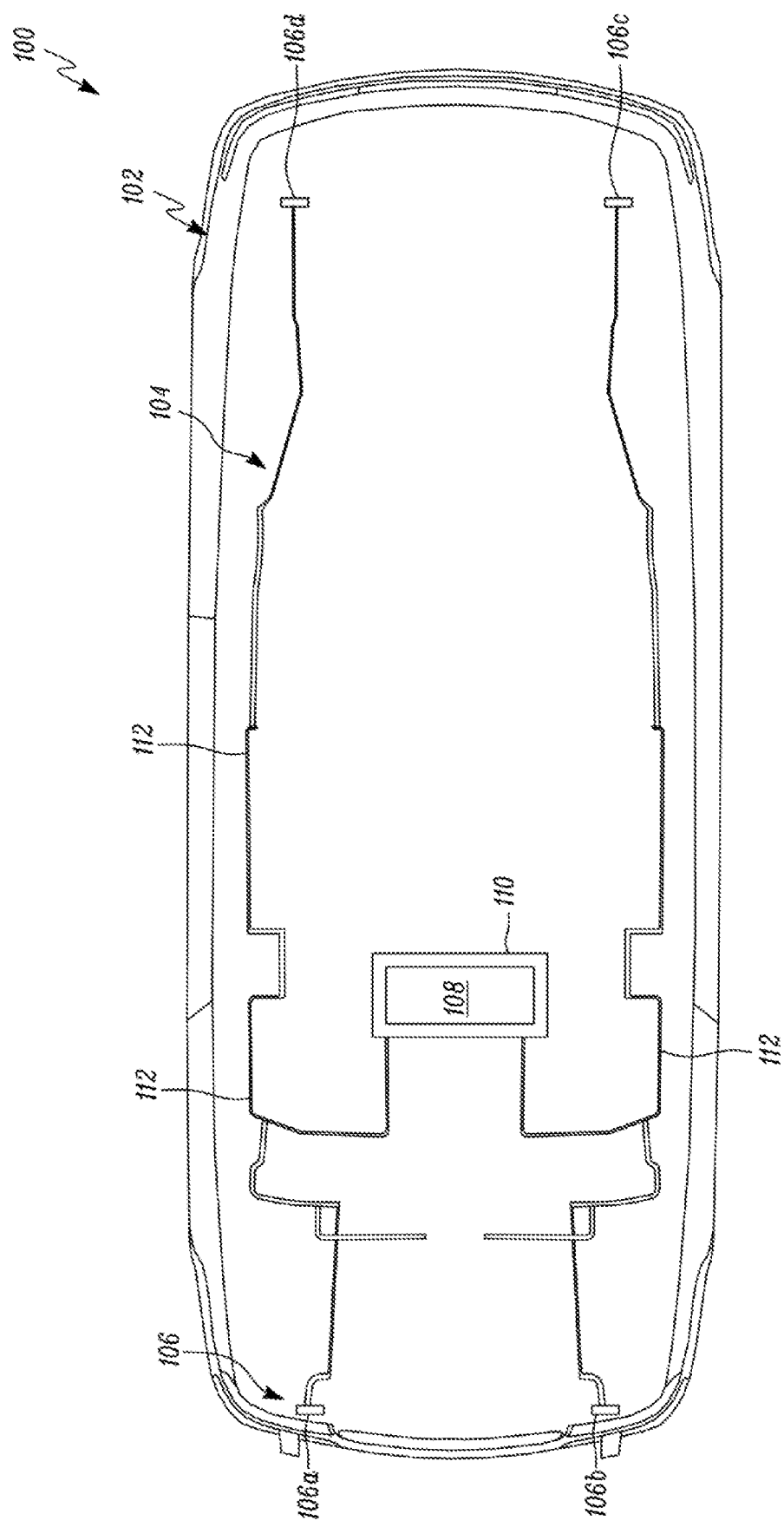
FIG. 1B is a diagram illustrating a vehicle that is constructed and operates according to a described embodiment to support autonomous driving.

FIG. 1B is a diagram illustrating a vehicle that is constructed and operates according to a described embodiment to support autonomous driving. The vehicle 100 includes an autonomous driving controller 108 has a body 102 and a wiring system 104 for connecting a plurality of autonomous driving sensors 106 having individual sensors 106a-106d to an autonomous driving controller 108. The wiring system 104 of FIG. 1B is a structural cable 112. The autonomous driving controller 108 may reside on or in or be co-located with an infotainment device 110. The infotainment device 110 may be used to control functions of various components present in the vehicle 100, e.g., to take over control of a steering function associated with a steering system (not shown) of the vehicle 100, a braking function, an acceleration function, or another function of the vehicle 100 related to autonomous driving or collision prevention. These operations of the infotainment device 110 are performed based upon interaction with the autonomous driving controller 108.

The autonomous driving sensors 106a-106d include cameras, RADAR sensors, LIDAR sensors, sonic proximity sensors, or other sensors that collect information relevant to the operation of the vehicle 100. For example, autonomous driving sensors 106a, 106b could be cameras while autonomous driving sensors 106c, 106d could be RADAR sensors. The autonomous driving sensors 106a-106d are communicatively connected to the autonomous driving controller 108 via the structural cable 112. The structural cable 112 may include a single conductor or a pair of conductors and may be twisted pair wiring, coaxial wiring, single conductor wiring, a power bus or wiring, strip wiring, or other wiring.

Figure 1C:
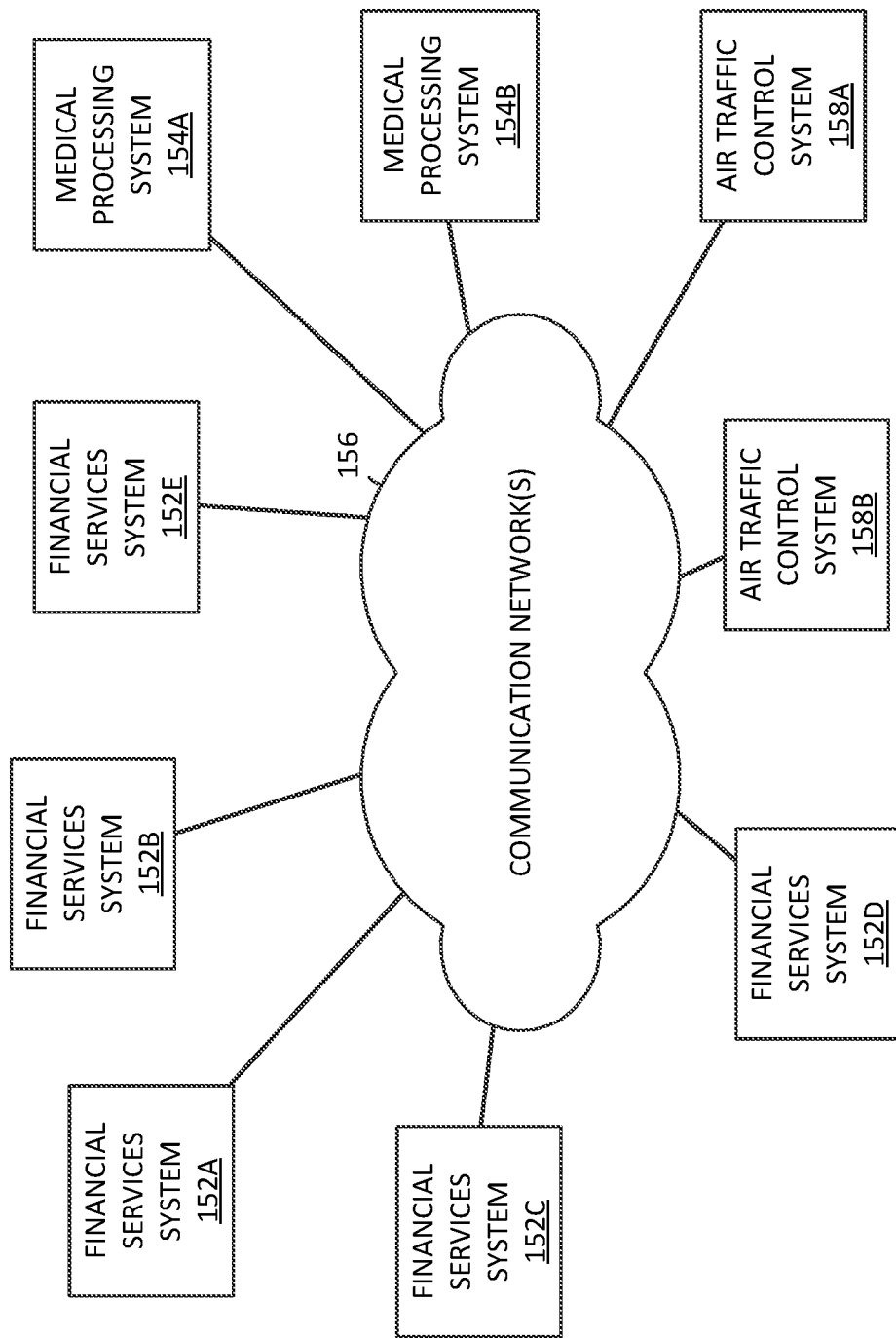
FIG. 1C is a system diagram illustrating a plurality of systems that include SoCs provisioned according to a described embodiment.

FIG. 1C is a system diagram illustrating a plurality of systems that include SoCs provisioned according to a described embodiment. The systems 150 of FIG. 1C include a plurality of financial services systems 152A, 152B, 152C, 152D, and 152E, a plurality of medical processing systems 154A and 154B, and a plurality of air traffic control systems 158A and 158B, that are shown to intercouple via one or more communication networks 156. The communication networks 156 may include the Internet, the World Wide Web (WWW), one or more intranets, one or more virtual Local Area Networks (LANs), one or more LANs, one or more wireless LANs (WLANs), and/or one or more other types of networks.

Because systems of the type described with reference to FIG. 1C are interconnected, they are subject to attack via the communication networks 156. Further autonomous driving systems are also subject to attack via servicing communication networks 14. While firewalls (hardware and software), malware filtering software, virus filtering software, and hardware and software would typically be installed to protect these systems 152A-158B and the autonomous driving systems, if SoCs servicing the systems are attached prior to provisioning, an attacker essentially has a back-door into these systems.

Thus, embodiments of the present disclosure provide protection between the manufacture of the SoC and the legitimate provisioning of the SoC. Operations of the present disclosure for provisioning SoCs will be described in detail with reference to FIGS. 10-13. SoC structures that may be provisioned according to the present disclosure are described with reference to FIGS. 4A-5B. An autonomous driving system will be described with reference to FIGS. 2-3B, particularly referencing components that include SoCs that are provisioned according to the present disclosure.

Figure 2:
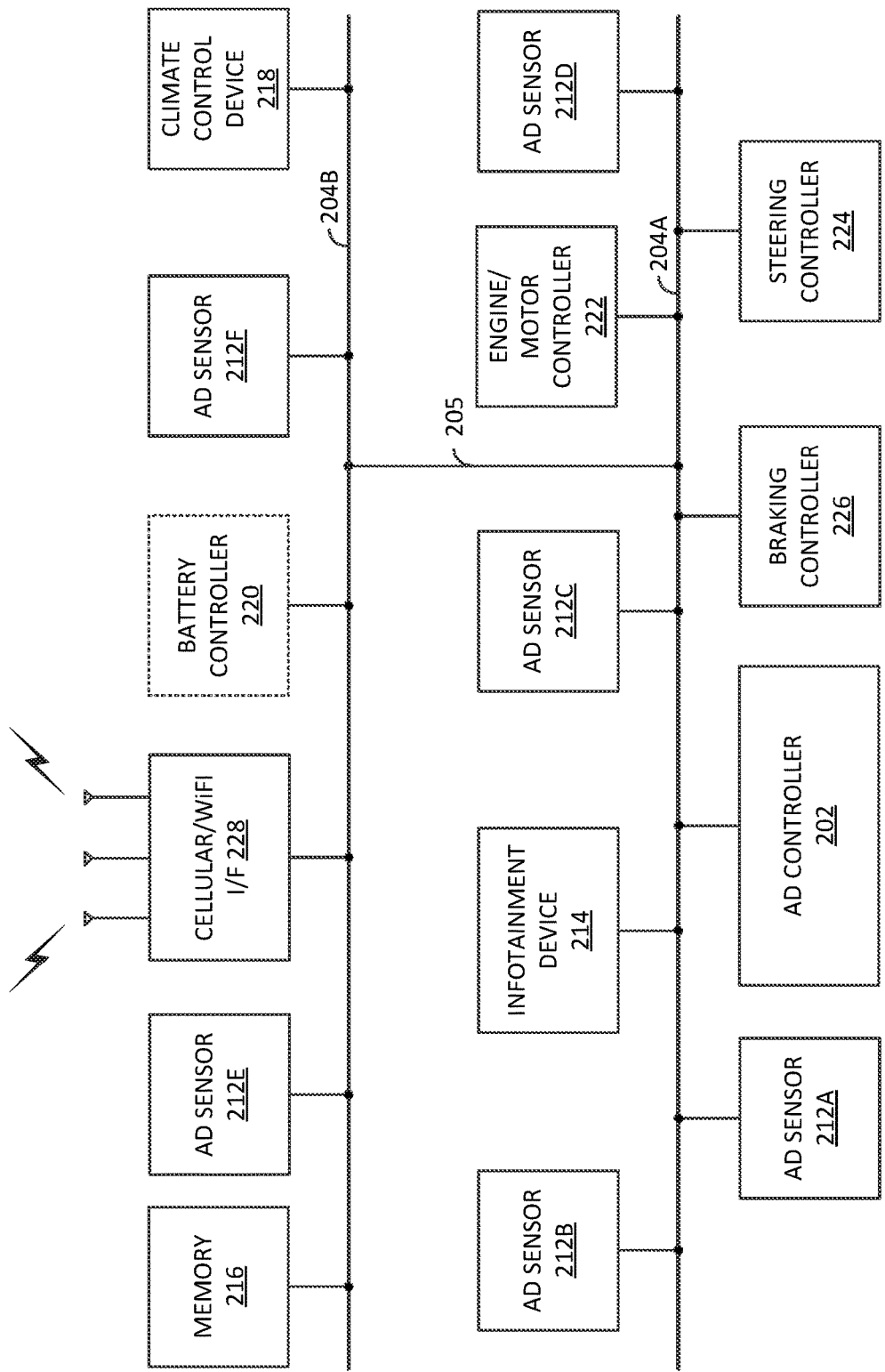
FIG. 2 is a block diagram illustrating an autonomous driving controller constructed and operating according to a first described embodiment.

FIG. 2 is a block diagram illustrating an autonomous driving system 200 constructed and operating according to a described embodiment. The autonomous driving system 200 includes a bus, an autonomous driving controller 108 coupled to the bus, and a plurality of autonomous driving sensors 212A-212F coupled to the bus. In the embodiment of FIG. 2, the bus includes two primary sections 204A and 204B intercoupled by section 205. The bus may be a twisted pair of conductors, a pair of strip conductors, a coaxial conductor, a two conductor power bus that carries DC power, or another structure having one or two conductors to support communications.

A plurality of devices communicates via the bus. These devices include the autonomous driving controller 108, the plurality of autonomous driving sensors 212A-212F, an infotainment device 214, memory 216, a climate control device 218, a battery controller 220 (when the vehicle is an electric vehicle or hybrid vehicle), an engine/motor controller 222, a steering controller 224, a braking controller 226, and a wireless interface 228 that includes multiple wireless interfaces, e.g., cellular, WiFi, Bluetooth, and/or other standards. The plurality of autonomous driving sensors 212A-212F may include one or more RADAR units, one or more LIDAR units, one or more cameras, and/or one or more proximity sensors. The plurality of autonomous driving sensors 212A-212F collect autonomous driving data and transmit the collected autonomous driving data to the autonomous driving controller 108 via the bus. The autonomous driving controller 108 then processes the data and, based on the processing, controls the driving of the vehicle, either fully or driver assisted, via controllers 222, 224, and 226.

Figure 3B:
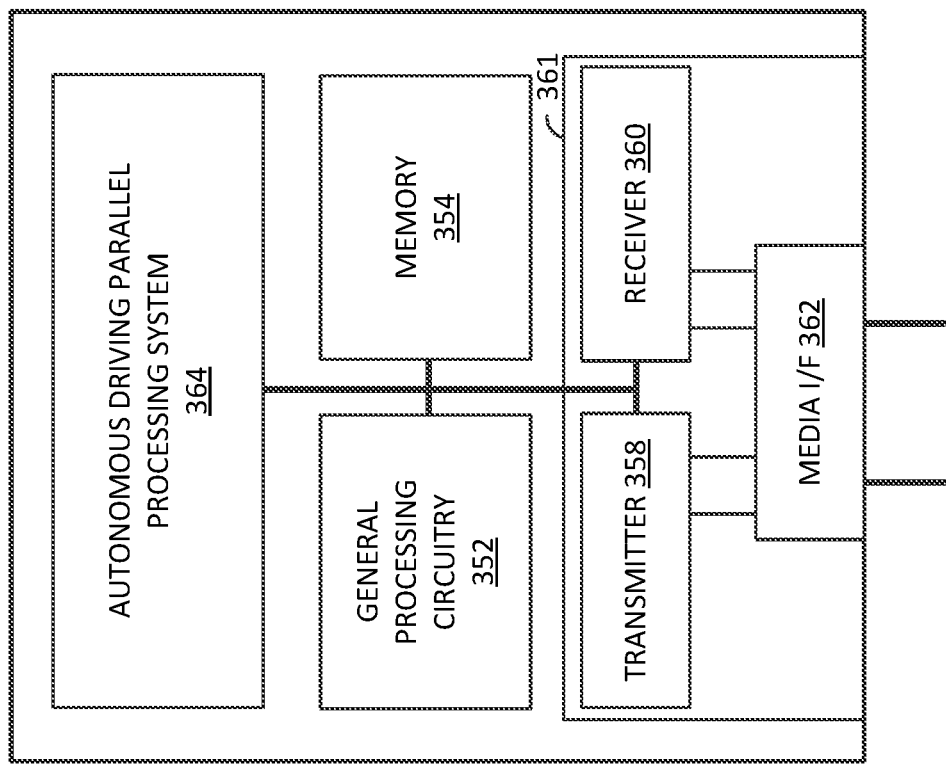
FIG. 3B is a block diagram illustrating an autonomous driving controller constructed according to a described embodiment.
Figure 3A:
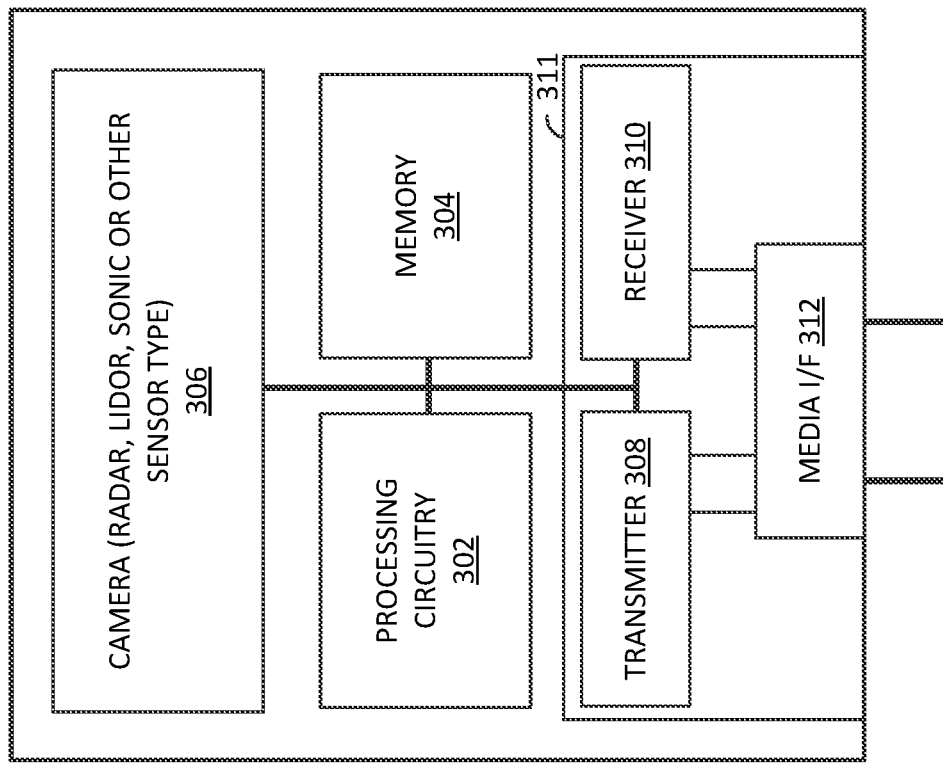
FIG. 3A is a block diagram illustrating an autonomous driving sensor constructed according to a described embodiment.

FIG. 3A is a block diagram illustrating an autonomous driving sensor constructed according to a described embodiment. The autonomous driving sensor 300 includes data collection component 306 configured to collect autonomous driving data. The data collection component 306 may be a RADAR sensor, a LIDAR sensor, a sonic proximity sensor, or another type of sensor. The autonomous driving sensor 300 further includes processing circuitry 302, memory 304, and a transceiver 311 coupled to the processing circuitry 302, to the memory 304, and to the data collection component 306 via a bus. The processing circuitry 302 executes programs stored in memory 304, e.g., autonomous driving emergency operations, reads and writes data from/to memory, e.g., data and instructions to support autonomous driving operations, to interact with the data collection component 306 to control the collection of autonomous driving data, to process the autonomous driving data, and to interact with the transceiver 311 to communicate via the bus, among other operations.

By way of example and not limitation, processing circuitry 302 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 304 may be dynamic memory, static memory, disk drive(s), flash drive(s), combinations of any of the foregoing, or any other form of computer memory. The memory 304 stores computer programs for operations of the present disclosure, may also store other computer programs, configuration information, and other short-term and long-term data necessary for implementation of the embodiments of the present disclosure.

The transceiver 311 includes a transmitter 308, a receiver 310, and a media I/F 312. The media I/F 312 may be a transmit/receive (T/R) switch, a duplexer, or other device that supports the illustrated coupling. In other embodiments, both the transmitter 308 and receiver 310 couple directly to the bus or couple to the bus other than via the media I/F 312. The transceiver 311 supports communications via the bus. The processing circuitry 302 and the transceiver 311 are configured to transmit autonomous driving data to the autonomous driving controller 108 on the bus. The AD controller 202 and/or other described components may include one or more SoCs that are provisioned according to the present disclosure.

FIG. 3B is a block diagram illustrating an autonomous driving controller constructed according to a described embodiment. The autonomous driving controller 108 includes general processing circuitry 352, memory 354, and a transceiver 361 coupled to the general processing circuitry 352 and configured to communicate with a plurality of autonomous driving sensors via the bus. The autonomous driving controller 108 also includes an autonomous driving parallel processing system 364 that operates on autonomous driving data received from the autonomous driving sensors and supports autonomous driving operations. The transceiver 361 includes a transmitter 358, a receiver 360, and a media I/F 362 that in combination support communications via the bus. The construct of the general processing circuitry 352 may be similar to the construct of the processing circuitry 302 of the autonomous driving sensor 300. The memory 354 may be of similar structure as the memory 304 of the autonomous driving sensor 300 but with capacity as required to support the functions of the autonomous driving controller 108. The AD parallel processing system 364 and/or the general processing circuitry may include one or more SoCs that are provisioned according to the present disclosure.

FIGS. 4A through FIG. 9 describe a parallel processing system that supports autonomous driving. This parallel processing system may include a single SoC or multiple SoCs, one or more of which may be securely provisioned according to one or more embodiments of the present disclosure. The principles and teachings described with reference to FIGS. 4A through FIG. 9 may be applied to SoCs of other systems as well, e.g., Financial Services Systems, Medical Processing systems, and air traffic control systems, among other systems.

Figure 4A:
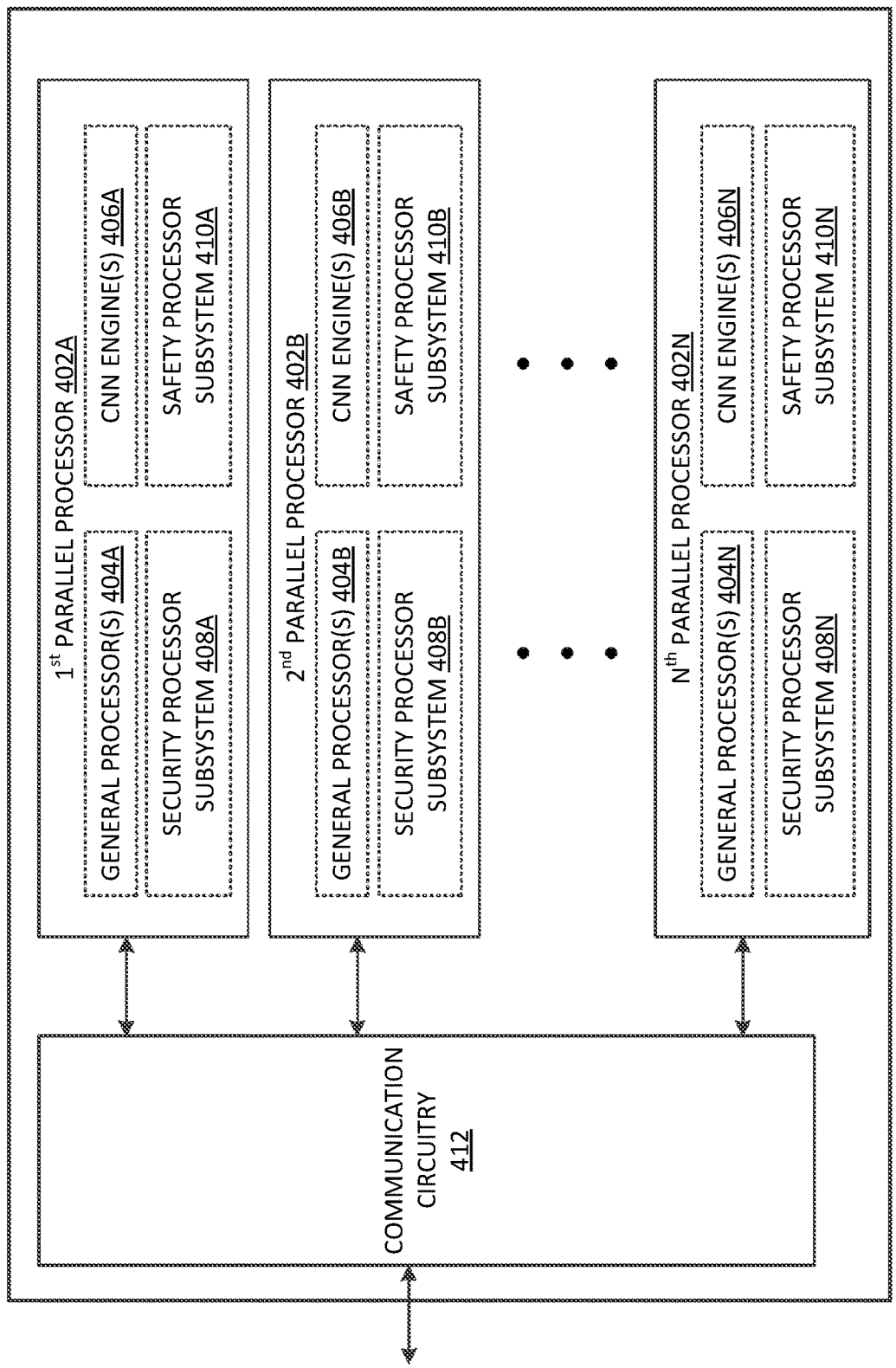
FIG. 4A is a block diagram illustrating a first embodiment of an autonomous driving parallel processing system constructed and operating according to the present disclosure.

FIG. 4A is a block diagram illustrating a first embodiment of an autonomous driving parallel processing system 400 constructed and operating according to the present disclosure. The parallel processing system 400 may be the parallel processing system 364 of FIG. 3B. Alternately, the parallel processing system 400 may a separate construct that services the autonomous driving needs of a vehicle. The parallel processing system 400 includes a plurality of parallel processors 402A, 402B, . . . , 402N, operating on common input data received from the plurality of autonomous driving sensors 212A-212N. Each of the plurality of parallel processors 402A-402N includes a plurality of components, some of which but not all are illustrated in FIG. 4A. Further components not illustrated in FIG. 4A (and FIG. 4B) may include internal communication circuitry, e.g., Network on a Chip (NoC) communication circuitry, memory controllers, parallel processor General Interface Channel (GIC) circuitry, one or more network interfaces, Read Only Memory (ROM), e.g., system ROM and secure ROM, Random Access Memory (RAM), e.g., general RAM, cache memory RAM, and secure RAM, watchdog timers, and other communication interfaces, for example.

A first parallel processor 402A includes one or more general processors 404A, one or more Convolutional Neural Network (CNN) engines 406A, a Security Processor Subsystem (SCS) 408A, and a Safety Processor Subsystem (SMS) 410A. Likewise, a second parallel processor 402B includes one or more general processors 404B, one or more CNN engines 406B, a SCS 408B, and a SMS 410B. Finally, an Nth parallel processor 402N includes one or more general processors 404N, one or more CNN engines 406N, a SCS 408N, and a SMS 410N.

Generally, the SCSs 408A-408N are responsible for the security of the respective plurality of parallel processors 402A-402N. Security functions performed by the SCSs 408A-408N may include authorizing firmware updates, limiting access to memory, authorizing/deauthorizing rights of communication with components external to the plurality of processing systems 402A-402N, and other security functions. The security operations may be performed as a group to secure the operation of the plurality of parallel processors 402A-402N, i.e., startup operations, validating software/firmware updates, monitoring access of the plurality of parallel processors, etc. The group of SCSs 408A-408N may work together to first independently determine whether to authorize an operation and, second, make a group decision that requires agreement of all SCSs 408A-408N before authorization is given.

The SMSs 410A-410C are responsible for the safety of autonomous driving by the autonomous driving controller. Because the plurality of parallel processors 402A-402N operate substantially on common input data and produce respective outputs, it is the role of the SMSs 410A-410N to determine whether the respective outputs of the parallel processors 402A-402N are in agreement, and if so, whether to authorize initiation or continuation of autonomous driving.

The autonomous driving parallel processing system 364 further includes communication circuitry 412 configured to support communications between the plurality of parallel processors 402A-402N, including communications between the general processors 404A-404N of the plurality of parallel processors 402A-402N and communications between the SCSs 408A-408N of the plurality of parallel processors 402A-402N that are protected by SCS cryptography. Further, the communication circuitry 412 is further configured to support communications between the SMSs 410A-410N of the plurality of parallel processors 402A-402N protected by SMS cryptography, the SMS cryptography differing from the SCS cryptography. With various aspects of the communication circuitry 412, the communication circuitry 412 may be partially formed in the plurality of parallel processors 402A-402N.

The SCS and the SMS cryptography may be any number of differing cryptographies, e.g., public key cryptography, secret key cryptography, or hash key cryptography, for example. The reader will understand that the principles of the present disclosure may be accomplished using many differing types of cryptography. Because the structure and operation of differing cryptographies is generally known, these structures and operations will not be described further herein except as they relate to the principles and teachings of the present disclosure. The SCS and SMS cryptography (and other cryptography) described herein will be done with reference to public key cryptography in which an SCS private key is used to encrypt communications between the SCSs and in which an SMS private key is used to encrypt communications between the SMSs. Private key cryptography may also be used to protect communications between general processors 404A-404N of the plurality of parallel processors 402A-402N, between components of a vehicle 100A, between vehicles, e.g., between vehicle 100A and 100D, and between a vehicle, e.g., 100A and the autonomous driving server 16.

The SCS private key may be retrieved from a local memory dedicated to the first SCS 408A, e.g., ROM, or from the Resistor Transistor Logic (RTL) of the first SCS 408A. Alternately, the SCS private key may be generated by the first SCS 408A based upon data retrieved from local memory dedicated to the first SCS. Generation of the SCS private key or retrieval of the SCS private key may be performed by dedicated hardware of the first SCS 408A.

Likewise, the SMS private key may be retrieved from a local memory dedicated to the first SMS 410A, e.g., ROM or from the RTL of the first SMS 410A. Alternately, the SMS private key may be generated by the first SMS 410A based upon data retrieved from the local memory dedicated to the first SMS 410A. Generation of the SMS private key or retrieval of the SMS private key may be performed by dedicated hardware of the first SMS 410A.

According to an aspect of the present disclosure, the plurality of parallel processors 402A-402N may be configured such that a second SCS 408B is configured to store a SCS private key received from another SCS 408A in local memory dedicated to the SCS 408A. Likewise, a second SMS 410B may be configured to store a SMS private key received from another SMS 410A in local memory dedicated to the SMS 410B.

According to another aspect of the present disclosure, each of the plurality of parallel processors 402A-402N includes dedicated SCS cryptography hardware corresponding to their SCSs 408A-N. According to still another aspect of the present disclosure, each of the plurality of parallel processors 402A-402N includes dedicated SMS cryptography hardware corresponding to their SMSs 410A-410N.

According to a slightly different aspect, a first parallel processor 402A may include an SCS 408A that includes dedicated SCS memory and/or SCS cryptography hardware. In such case, the SCS 408A retrieves the SCS private key from its dedicated memory or generates the SCS private key and distributes the SCS private key to the other SCSs 408B-408N. In such case, one or more of the other SCSs 408-408N do not have dedicated SCS memory or SCS cryptography hardware. These same aspects may be applied to the SMSs 410A-410N of the plurality of parallel processors 402A-402N.

In establishing the SCS cryptography, a first SCS, e.g., 408A, of a first parallel processor 402A of the plurality of parallel processors 402A-402N may be configured to establish a private communication link with a second SCS 408B of a second parallel processor 402B of the plurality of parallel processors 402A-402N and use the private communication link to transmit a SCS private key to the second SCS 408B of the second parallel processor 402B for subsequent use in communications protected by the SCS cryptography. In establishing the private communication link with the second SCS 408B of the second parallel processor 402B of the plurality of parallel processors, the first SCS 408A of the first parallel processor 402A may use dedicated SCS cryptography hardware of the first SCS 408A and the second SCS 408B of the second parallel processor 402B may use dedicated SCS cryptography hardware of the second SCS 408B. These operations will be described further herein with reference to FIGS. 6A, 6B, 6C, 7 and 8. As will be described therewith, in establishing the private communication link with the second SCS of the second parallel processor of the plurality of parallel processors, the first SCS may use one or more of the Diffie-Hellman algorithm and/or a Rivest-Shamir-Adleman (RSA) algorithm.

The autonomous driving parallel processing system 400 may have a number of differing physical constructs. According to one construct, the plurality of parallel processors 402A-402B is formed on a single SoC. With this construct, the communication circuitry 412 may also be formed on the SoC. With another construct, the plurality of parallel processors is formed on differing respective integrated circuits (differing SoCs). Further, with still another construct, a first group of the plurality of parallel processors 402A-402N is formed on a first integrated circuit (first SoC) and a second group of the plurality of parallel processors 402A-402N is formed on a second integrated circuit (second SoC). Of course, other physical constructs may be formed without departing from the scope of the present disclosure. Each of these SoCs may be securely provisioned according to one or more embodiments of the present disclosure.

According to another aspect of the present disclosure, the communication circuitry supports intra-vehicle communications among the plurality of autonomous driving sensors 212A-212N and the autonomous driving controller 202 using intra-vehicle cryptography that differs from the SCS cryptography and the SMS cryptography. Further, according to still another aspect of the present disclosure, wherein the communication circuitry supports extra-vehicle communications using extra-vehicle cryptography that differs from both the intra-vehicle cryptography and the SCS cryptography and the SMS cryptography.

Figure 4B:
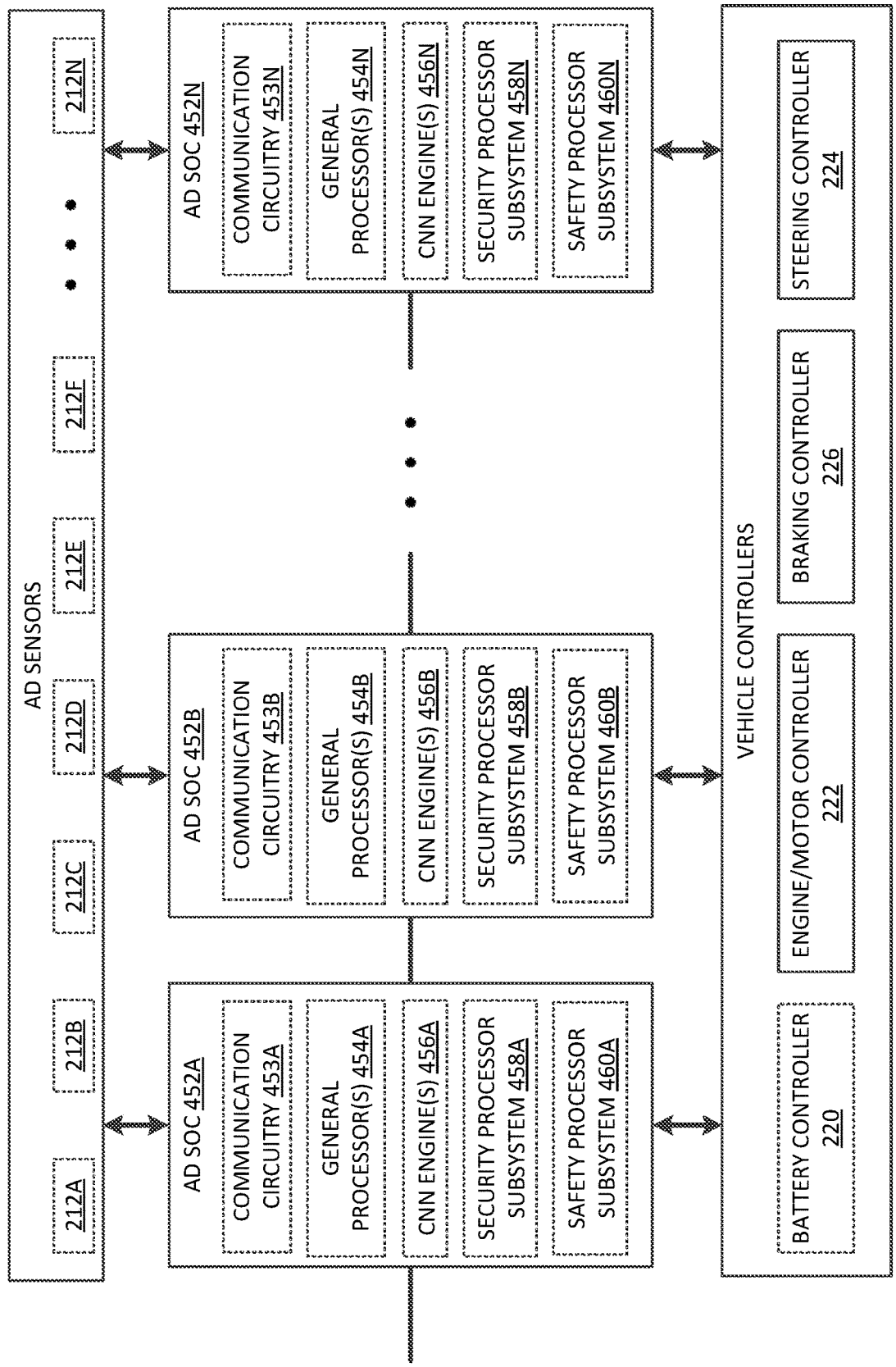
FIG. 4B is a block diagram illustrating a second embodiment of an autonomous driving parallel processing system constructed and operating according to the present disclosure.

FIG. 4B is a block diagram illustrating a second embodiment of an autonomous driving parallel processing system 450 constructed and operating according to the present disclosure. The autonomous driving parallel processing system 450 may be the autonomous driving parallel processing system 364 of FIG. 3B or may be a separate construct. As contrasted to the structure of FIG. 4A, the autonomous driving parallel processing system 450 of FIG. 4B includes a SoC for each parallel processor 452A-452N. Further, the communication circuitry 453A-453N resides, respectively, in the plurality of parallel processors 452A-452N. The parallel processing system may service all autonomous driving needs of a vehicle.

The parallel processing system 450 includes a plurality of parallel processors 452A, 452B, . . . , 452N, operating on common input data received from the plurality of autonomous driving sensors 212A-212N. The parallel processing system 450 also provides output data to vehicle controllers 220, 222, 226, and 224. This output data may be provided by agreement among the plurality of parallel processors 452A-452N or by a designated parallel processor of the plurality of parallel processors 452A-452N.

Each of the plurality of parallel processors 452A-452N may include components not illustrated in FIG. 4A and which may include internal communication circuitry, e.g., Network on a Chip (NoC) communication circuitry, memory controllers, parallel processor General Interface Channel (GIC) circuitry, one or more network interfaces, Read Only Memory (ROM), e.g., system ROM and secure ROM, Random Access Memory (RAM), e.g., general RAM, cache memory RAM, and secure RAM, watchdog timers, and other communication interfaces, for example.

A first parallel processor 452A includes communication circuitry 453A, one or more general processors 454A, one or more CNN engines 456A, a SCS 458A, and a SMS 460A. Likewise, a second parallel processor 452B includes communication circuitry 453B, one or more general processors 454B, one or more CNN engines 456B, a SCS 458B, and a SMS 460B. Finally, an Nth parallel processor 452N includes communication circuitry 453N, one or more general processors 454N, one or more CNN engines 456N, a SCS 458N, and a SMS 460N.

The communication circuitry 453A-453N is configured to support communications between the plurality of parallel processors 452A-452N, including communications between the general processors 454A-454N of the plurality of parallel processors 452A-452N and communications between the SCSs 458A-458N of the plurality of parallel processors 452A-452N that are protected by SCS cryptography. Further, the communication circuitry 453A-453N is further configured to support communications between the SMSs 460A-460N of the plurality of parallel processors 452A-452N protected by SMS cryptography, the SMS cryptography differing from the SCS cryptography. With various aspects of the communication circuitry 462, the communication circuitry 453A-453N may be partially formed external to the plurality of parallel processors 452A-452N.

The SCS and the SMS cryptography of the parallel processing system 450 of FIG. 4B may be same similar as the SCS and SMS cryptography described with reference to FIG. 4A. Further, the particular structures and operations of the SCS and SMS of the parallel processing system 450 of FIG. 4B may be same or similar to those of FIG. 4A. Moreover, public key cryptography may also be used to protect communications between general processors 454A-454N of the plurality of parallel processors 452A-452N, between components of a vehicle 100A, between vehicles, e.g., between vehicle 100A and 100D, and between a vehicle, e.g., 100A and the autonomous driving server 16.

The SCS private key may be retrieved from a local memory dedicated to the first SCS 458A, e.g., ROM, or from the Resistor Transistor Logic (RTL) of the first SCS 458A. Alternately, the SCS private key may be generated by the first SCS 458A based upon data retrieved from local memory dedicated to the first SCS. Generation of the SCS private key or retrieval of the SCS private key may be performed by dedicated hardware of the first SCS 458A.

Likewise, the SMS private key may be retrieved from a local memory dedicated to the first SMS 460A, e.g., ROM or from the RTL of the first SMS 460A. Alternately, the SMS private key may be generated by the first SMS 460A based upon data retrieved from the local memory dedicated to the first SMS 460A. Generation of the SMS private key or retrieval of the SMS private key may be performed by dedicated hardware of the first SMS 460A.

According to an aspect of the present disclosure, the plurality of parallel processors 452A-452N may be configured such that a second SCS 458B is configured to store a SCS private key received from another SCS 458A in local memory dedicated to the SCS 458A. Likewise, a second SMS 460B may be configured to store a SMS private key received from another SMS 460A in local memory dedicated to the SMS 460B.

In establishing the SCS cryptography, a first SCS, e.g., 458A, of a first parallel processor 452A of the plurality of parallel processors 452A-452N may be configured to establish a private communication link with a second SCS 458B of a second parallel processor 452B of the plurality of parallel processors 452A-452N and use the private communication link to transmit a SCS private key to the second SCS 458B of the second parallel processor 452B for subsequent use in communications protected by the SCS cryptography. In establishing the private communication link with the second SCS 458B of the second parallel processor 452B of the plurality of parallel processors, the first SCS 458B of the first parallel processor 452A may use dedicated SCS cryptography hardware of the first SCS 458B and the second SCS 458B of the second parallel processor 452B may use dedicated SCS cryptography hardware of the second SCS 458B. These operations will be described further herein with reference to FIGS. 6A, 6B, 6C, 7 and 8. As will be described therewith, in establishing the private communication link with the second SCS of the second parallel processor of the plurality of parallel processors, the first SCS may use one or more of the Diffie-Hellman algorithm and/or the RSA algorithm.

With the construct of FIG. 4B, the plurality of parallel processors 452A-452N are formed as a plurality of SoCs. Thus, each of these SoCs may be securely provisioned according to one or more embodiments of the present disclosure. According to another aspect of the present disclosure, the communication circuitry supports intra-vehicle communications among the plurality of autonomous driving sensors 212A-212N and the autonomous driving controller 450 using intra-vehicle cryptography that differs from the SCS cryptography. Further, according to still another aspect of the present disclosure, wherein the communication circuitry supports extra-vehicle communications using extra-vehicle cryptography that differs from both the intra-vehicle cryptography and the SCS cryptography.

Figure 5A:
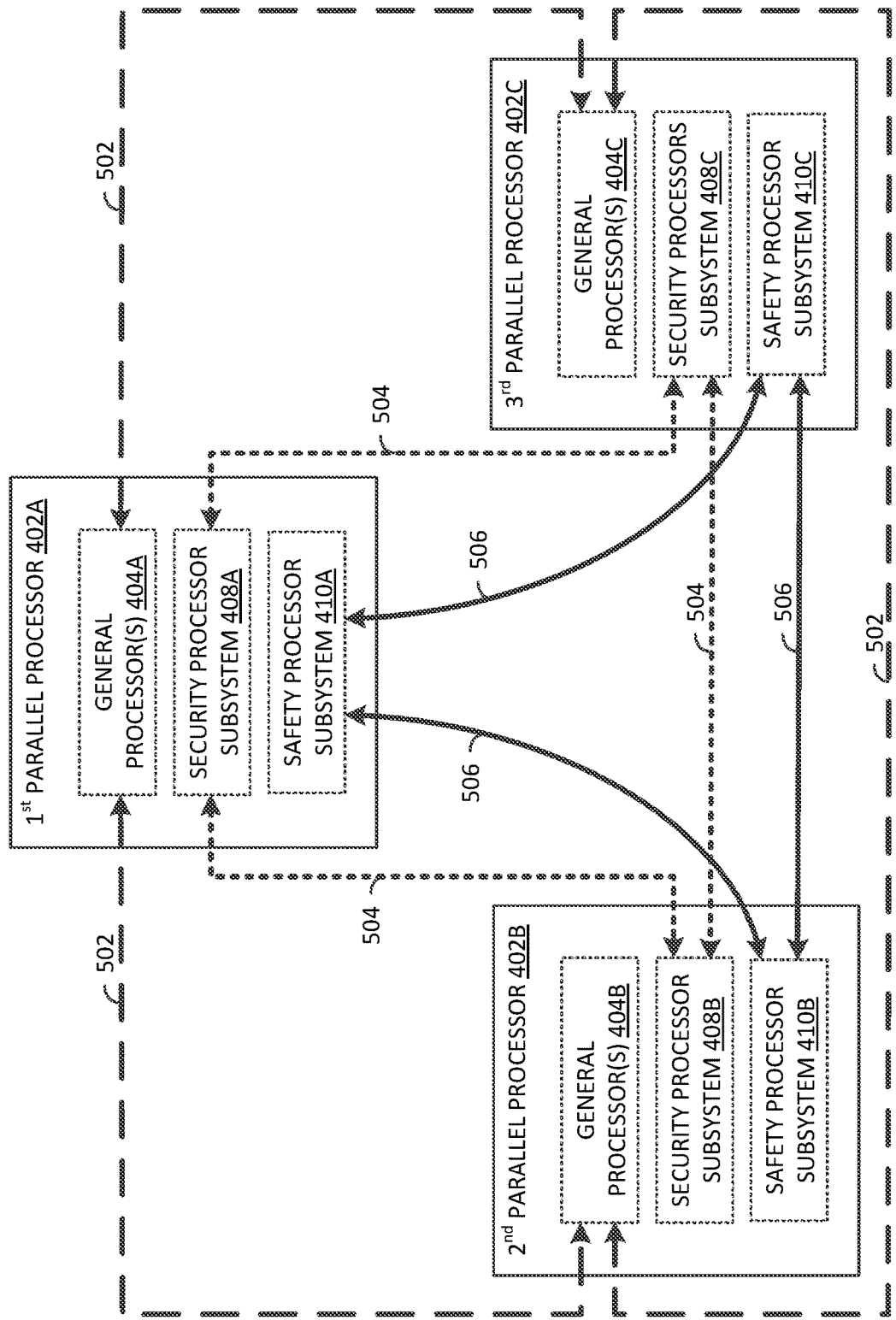
FIG. 5A is a block diagram illustrating communications among components of the autonomous driving parallel processors of FIGS. 4A and/or 4B.

FIG. 5A is a block diagram illustrating communications among components of the autonomous driving parallel processors of FIGS. 4A and/or 4B (400 and 450). Shown are three parallel processors 402A, 402B, and 402C that service communications among their general processors 404A-404C, among their SCSs 408A-408C, and among their SMSs 410A-410C in differing manners. From one viewpoint, different roots of trust are established between differing sets of components. A first root of trust is established among the general processors 404A, 404B, and 404C of the parallel processors 402A, 402B, and 402C. This root of trust among the general processors 404A, 404B, and 404C may be established so that communications therebetween are not encrypted. Alternately, the root of trust among the general processors 404A, 404B, and 404C may be established on a vehicle wide basis such that a shared public key/private key pair is used by all components within the vehicle to protect intra-vehicle communications, e.g., between the general processors 404A, 404B, and 404C and the autonomous driving sensors 212A-212N. The first root of trust is then used to support general processor communications 502 between the general processors 404A, 404B, and 404C.

Further, another root of trust is established among the SCSs 408A, 408B, and 408C that uses an SCS public/private key pair. The SCS private key (and SCS public key) may be hard wired, e.g., ROM or RTL, in one of the SCSs 408A, 408B, or 408C. The SCS private key is then distributed among the other SCSs 408B and 408C of the parallel processing system, which is subsequently used for all SCS communications 504 between the SCSs 408A-408C.

Additionally, another root of trust is established among the SMSs 410A, 410B, and 410C that uses an SMS public/private key pair that is different from the SCS public/private key pair. The SMS private key (and SMS public key) may be hard wired, e.g., ROM or RTL, in one of the SMSs 410A, 410B, or 410C. The SMS private key is then distributed among the other SMSs 410B and 410C of the parallel processing system, which is subsequently used for all SMS communications 506 between the SMSs 410A-410C.

The same or differing encryption types may be used for the differing roots of trust. For example, a weak encryption may be used for the general processor communications 502 with stronger encryption used for the SCS communications 504 and the SMS communications 506. Further, with some aspects, a strongest encryption is used for the SCS communications 504 because the SCSs are the most secure components of the parallel processing system.

Figure 5B:
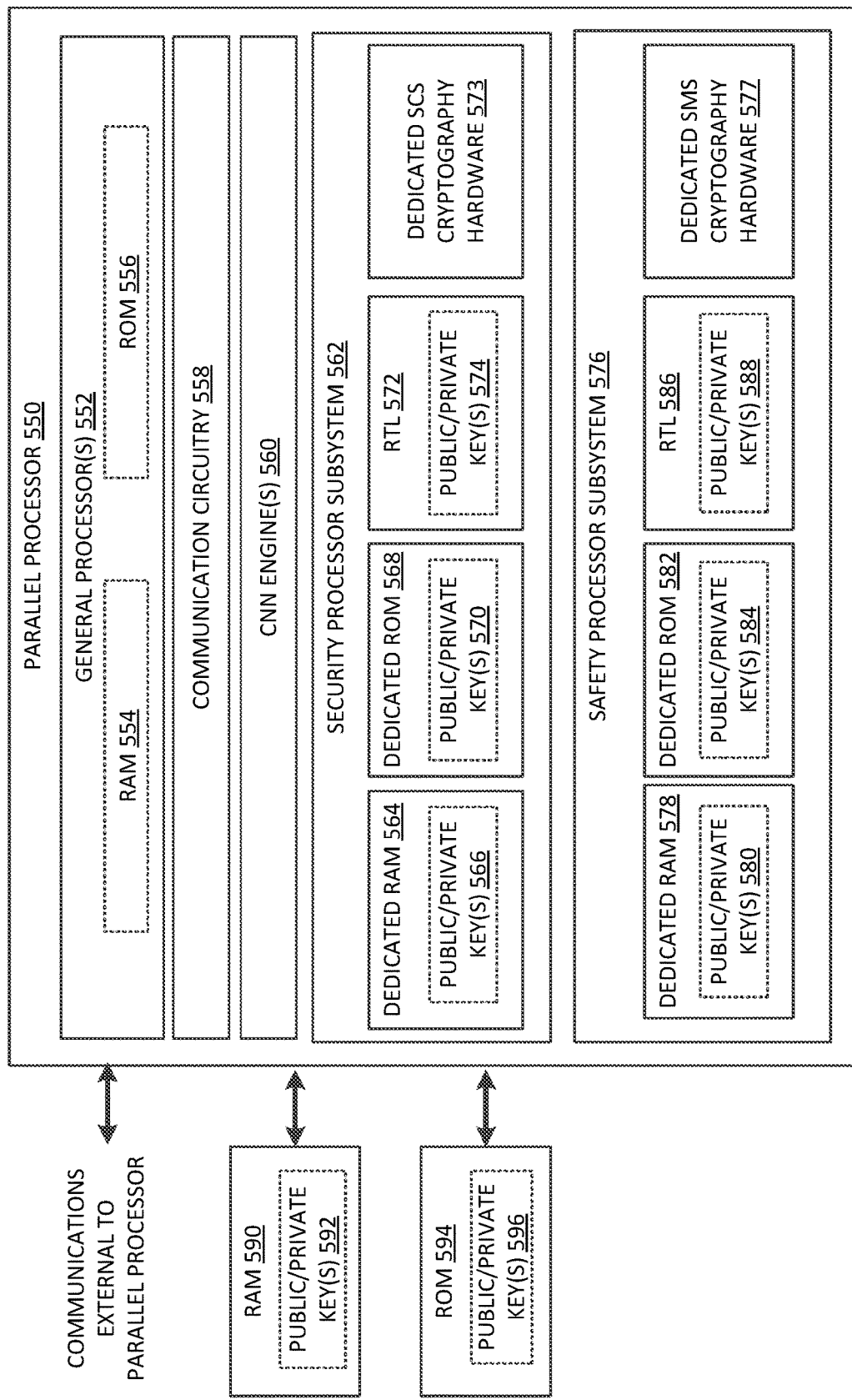
FIG. 5B is a block diagram illustrating components of a parallel processor of the autonomous driving parallel processors of FIGS. 4A and/or 4B according to one or more aspects of the described embodiments.

FIG. 5B is a block diagram illustrating components of a parallel processor of the autonomous driving parallel processors of FIGS. 4A and/or 4B according to one or more aspects of the described embodiments. A parallel processor 550 includes one or more general processors 552, communication circuitry 558, one or more CNN engines 560, a SCS 562, and a SMS 576. The general processors include local RAM 554 and local ROM 556. The communication circuitry 558 is configured to support communications between the parallel processor 550 and other parallel processors and between the parallel processor 550 and other components external to the parallel processor 550. RAM 590 services the parallel processor 550 and stores data that may include public/private keys 592. The ROM 594 services the parallel processor 550 and stores data that may include public/private keys 596.

The parallel processor 550 further includes CNN engine (s) 506, a SCS 562 and a SMS 576. The SCS 562 includes dedicated RAM 564 that may be used to store public/private keys 566. Further, the SCS 562 further includes dedicated ROM 568 and RTL 572 that may store public/private keys 570 and 574, respectively. The SCS 562 may further include dedicated SCS cryptography hardware 573 that supports the SCS cryptography operations according to the present disclosure, and which may include key generation, communication encryption, and communication decryption operations.

Likewise, the SMS 576 further includes dedicated RAM 578 that may be used to store public/private keys 580. Further, the SMS 576 further includes dedicated ROM 582 and RTL 586 that may store public/private keys 584 and 588, respectively. The RTL 572 and 586 are hard programmed during manufacture of the parallel processor 550 and the ROM 568 and 582 may be programmed during provisioning of the parallel processor 550. The SMS 576 may further include dedicated SMS cryptography hardware 577 that supports the SMS cryptography operations according to the present disclosure, and which may include key generation, communication encryption, and communication decryption operations.

The parallel processor 550 supports SCS and the SMS cryptography that may be same/similar as the SCS and SMS cryptography described with reference to FIGS. 4A, 4B and 5A. Further, the parallel processor 550 also supports general processor 552 communications as were previously described herein with reference to other structure(s).

Consistent with the previously described operations, the SCS private key may be retrieved from the ROM 568 or the RTL 572. Alternately, the SCS private key may be generated by the SCS 562 based upon data retrieved from the ROM 568 or RTL 572. Generation of the SCS private key or retrieval of the SCS private key may be performed by dedicated hardware 573 of the SCS 562.

Likewise, the SMS private key may be retrieved from the ROM 582 or the RTL 586. Alternately, the SMS private key may be generated by the SMS 576 based upon data retrieved from the ROM 582 or RTL 586. Generation of the SMS private key or retrieval of the SMS private key may be performed by dedicated SMS circuitry 577 of the SMS 576.

Referring to all of FIGS. 4A-5B, provisioning of an SoC according to embodiment of the present disclosure, a SCS may be configured to receive, via communication circuitry, encrypted provisioning data, access a public key from RTL of the SoC, and decrypt the encrypted provisioning data using the public key to create decrypted provisioning data. The RTL may be boot ROM of the SoC in some embodiments. Further, at least one of the SCS and at least one of the plurality of processors may be configured to provision the SoC using the decrypted provisioning data. The SCS may further encrypt a message using the public key to create an encrypted message and transmit the encrypted message via the communication circuitry.

Still referring to all of FIGS. 4A-5B, according to another embodiment of the present disclosure, a SCS may be configured to receive, via the communication circuitry, encrypted provisioning data, access a secret shared key from the RTL of the SoC, and decrypt the encrypted provisioning data using the secret shared key to create decrypted provisioning data. The RTL may be boot ROM of the SoC in some embodiments. Further, at least one of the SCS and at least one of the plurality of processors may be configured to provision the SoC using the decrypted provisioning data. The SCS may be further configured to encrypt a message using the secret shared key to create an encrypted message and transmit the encrypted message via the communication circuitry.

In other embodiments, both public/private key cryptography and a secret shared key may be used to provide further protection during provisioning and thereafter. The security measures put into place during provisioning may be further used at a later time to authenticate or load firmware and/or to authenticate data sent from the SoC to a provisioning station, e.g., load data into the SoC that requires utmost protection, e.g., loading of SCS private keys, loading of SMS private keys, intra-vehicle private keys, and/or inter-vehicle private keys. Either or both of the public/private keys and the secret shared key may be used to service these transactions. These operations may be performed before or after the SoCs are deployed in the field.

FIG. 6A is a flow diagram illustrating operations of an autonomous driving controller to establish secure communications among a plurality of SCSs according to one or more described embodiments. According to the operations 600 of FIG. 6A, a first SCS of a corresponding parallel processor of a parallel processing system of the autonomous driving controller accesses an SCS private key from ROM or RTL (Step 602). The first SCS may use its dedicated SCS hardware to access the SCS private key. Operations 600 continue with the first SCS establishing secure communication paths with the other SCSs of the parallel processing system (Step 604). The operations of Step 604 may also be performed using dedicated hardware of the SCSs. Operations 600 continue with the first SCS transmitting the SCS private key to the other SCSs using the established secure communication paths (Step 606). Step 606 may also be performed using dedicated hardware of the SCSs. With the SCS private key distributed, operations conclude with the SCSs communicating with one another using the SCS private key (Step 608). Step 608 as well may be performed by the SCSs using dedicated hardware.

FIG. 6B is a flow diagram illustrating differing operations of an autonomous driving controller to establish secure communications among a plurality of Security Processor Subsystems (SCSs) according to one or more described embodiments. According to the operations 620 of FIG. 6B, a first SCS of a corresponding parallel processor of a parallel processing system of the autonomous driving controller generates an SCS private key (Step 622). The SCS private key may be generated based upon data retrieved from ROM or RTL. Further, the first SCS may use its dedicated SCS hardware to generate the SCS private key.

Operations 620 continue with the first SCS establishing secure communication paths with the other SCSs of the parallel processing system (Step 624). The operations of Step 624 may also be performed using dedicated hardware of the SCSs. Operations 620 continue with the first SCS transmitting the SCS private key to the other SCSs using the established secure communication paths (Step 626). Step 626 may also be performed using dedicated hardware of the SCSs. With the SCS private key distributed, operations conclude with the SCSs communicating with one another using the SCS private key (Step 628). Step 628 as well may be performed by the SCSs using dedicated hardware.

The operations 600 of FIG. 6A and the operations 620 of FIG. 6B may be performed also for the SMSs. In such case, the SMSs would perform operations the same as, similar to, or equivalent to the operations 600 and 620 of FIGS. 6A and 6B, respectively.

FIG. 6C is a flow diagram illustrating operations of an autonomous driving controller to establish secure communications among a plurality of SCSs and a plurality of SMSs according to one or more described embodiments. The operations 650 commence with a first SCS of a first parallel processor of the plurality of parallel processors acquiring an SCS private key (Step 654). The SCS private key may be retrieved from memory, e.g., ROM, or from RTL, for example. Alternately, the SCS may generate the SCS private key using data retrieved from memory or from RTL. Operations 650 continue with the first SCS securely distributing the SCS private key to other SCSs of other parallel processors of the plurality of parallel processors (Step 656). Steps 654 and 656 may be performed using dedicated hardware and/or dedicated memory of the first SMS.

The operations 650 continue with a first SMS of the first parallel processor of the plurality of parallel processors acquiring an SMS private key, wherein the SMS private key differs from the SCS private key (Step 658). The SMS private key may be retrieved from memory, e.g., ROM, or from RTL, for example. Alternately, the SMS may generate the SMS private key using data retrieved from memory or from RTL. Operations 650 continue with the first SMS securely distributing the SMS private key to other SMSs of other parallel processors of the plurality of parallel processors (Step 660). Steps 656 and 658 may be performed using dedicated hardware and/or dedicated memory of the first SMS.

Operations 650 continue with the first SCS communicating with the other SCSs of the other parallel processors of the plurality of parallel processors using SCS cryptography based on the SCS private key (Step 662) and conclude with the first SMS communicating with the other SMSs of the other parallel processors of the plurality of parallel processors using SMS cryptography based on the SMS private key (Step 664). The operations 650 of FIG. 6C may be performed using dedicated hardware and/or dedicated memory of the first SCS and/or the first SMS.

Figure 7:
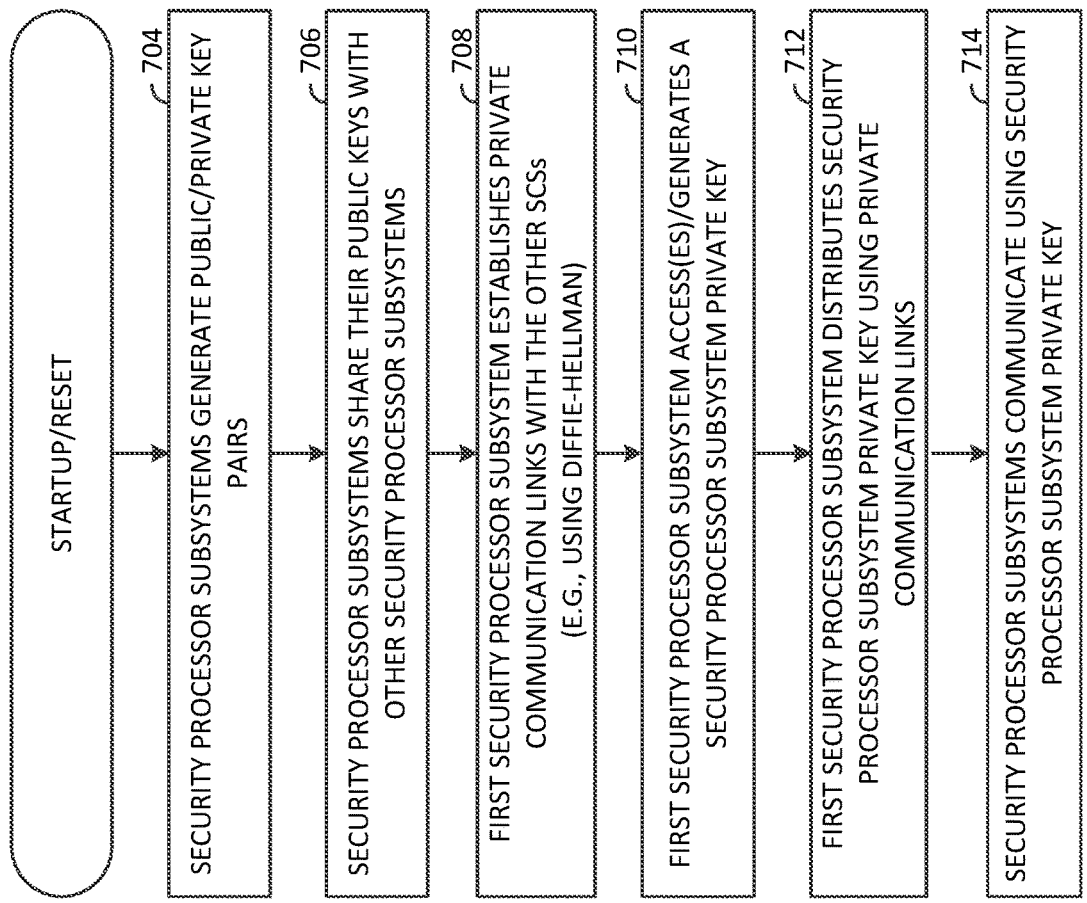
FIG. 7 is a flow diagram illustrating operations of an autonomous driving controller to distribute an SCS private key according to one or more described embodiments.

FIG. 7 is a flow diagram illustrating operations of an autonomous driving controller to distribute an SCS private key according to one or more described embodiments. Operations 700 begin at startup or reset and commence with each SCS of parallel processors of the autonomous driving controller generating a public/private key pair (Step 704). Thus, after the conclusion of Step 704, each SCS has respective public/private key pairs, which may be generated using dedicated hardware and/or dedicated memory. The SCSs then share their public keys with one another (Step 706). Then, a first SCS establishes private communication links with the other SCSs using a privacy algorithm (Step 708). Step 708 may implement the Diffie-Hellman algorithm, which uses public/private key pairs of differing SCSs to establish a shared secret word between SCSs that is used to encrypt communications there between.

Operations 700 continue with the first SCS accessing or generating a SCS private key (Step 710). As was previously discussed, the SCS private key may be accessed from ROM or the RTL if programmed. Alternately, the SCS may generate the SCS private key using data accessed from ROM or RTL. The first SCS then distributes the SCS private key to each other of the SCSs using the private communication links (Step 712). The SCSs then use the SCS private key to encrypt communications between one another (Step 714). The SMSs may use a technique that is the same, similar, or equivalent to the operations 700 of FIG. 7 to establish encrypted communications there between.

Figure 8:
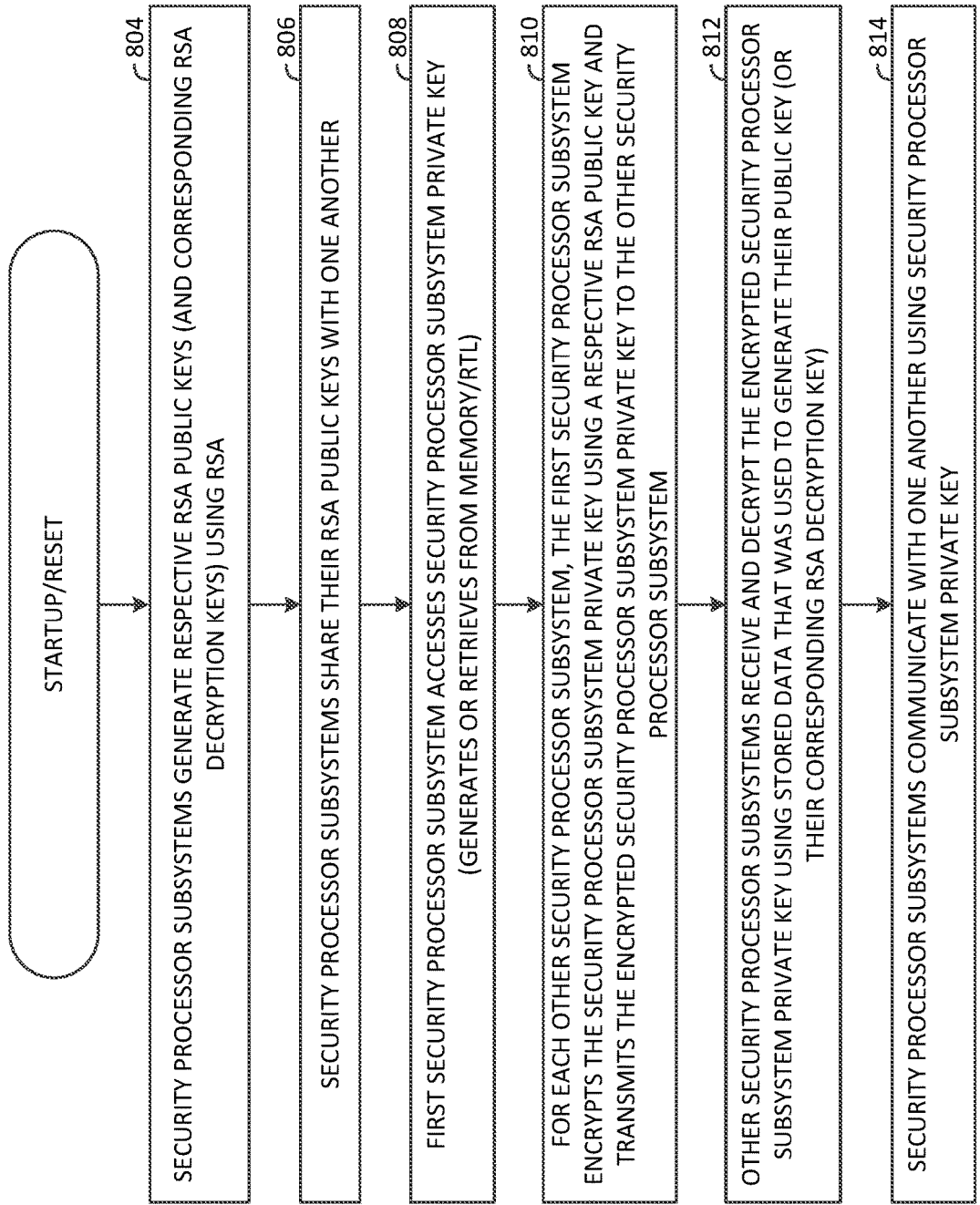
FIG. 8 is a flow diagram illustrating second operations of an autonomous driving controller to distribute an SCS private key according to one or more described embodiments.

FIG. 8 is a flow diagram illustrating second operations of an autonomous driving controller to distribute an SCS private key according to one or more described embodiments. Operations 800 begin at startup or reset and commence with each SCS of parallel processors of the autonomous driving controller generating RSA public keys (and corresponding decryption keys) using an RSA algorithm (Step 804). Thus, after the conclusion of Step 804, each SCS has a respective public key, which may be generated using dedicated hardware and/or dedicated memory. The SCSs then share their RSA public keys with one another (Step 806).

Operations 800 continue with the first SCS accessing or generating a SCS private key (Step 808). As was previously discussed, the SCS private key may be accessed from ROM or the RTL if programmed. Alternately, the SCS may generate the SCS private key using data accessed from ROM or RTL. The first SCS then distributes the SCS private key to each other of the SCSs by encrypting the SCS private key with the respective RSA key of each other SCS and transmits the respectively encrypted SCS private keys (Step 810). The other SCSs receive and decrypt the SCS private keys using respective data that was used to create their private keys of using an RSA decryption key that they generated (Step 812). The SCSs then use the SCS private key to encrypt communications between one another (Step 814). The SMSs may use a technique that is the same, similar, or equivalent to the operations 800 of FIG. 8 to establish encrypted communications there between.

Figure 9:
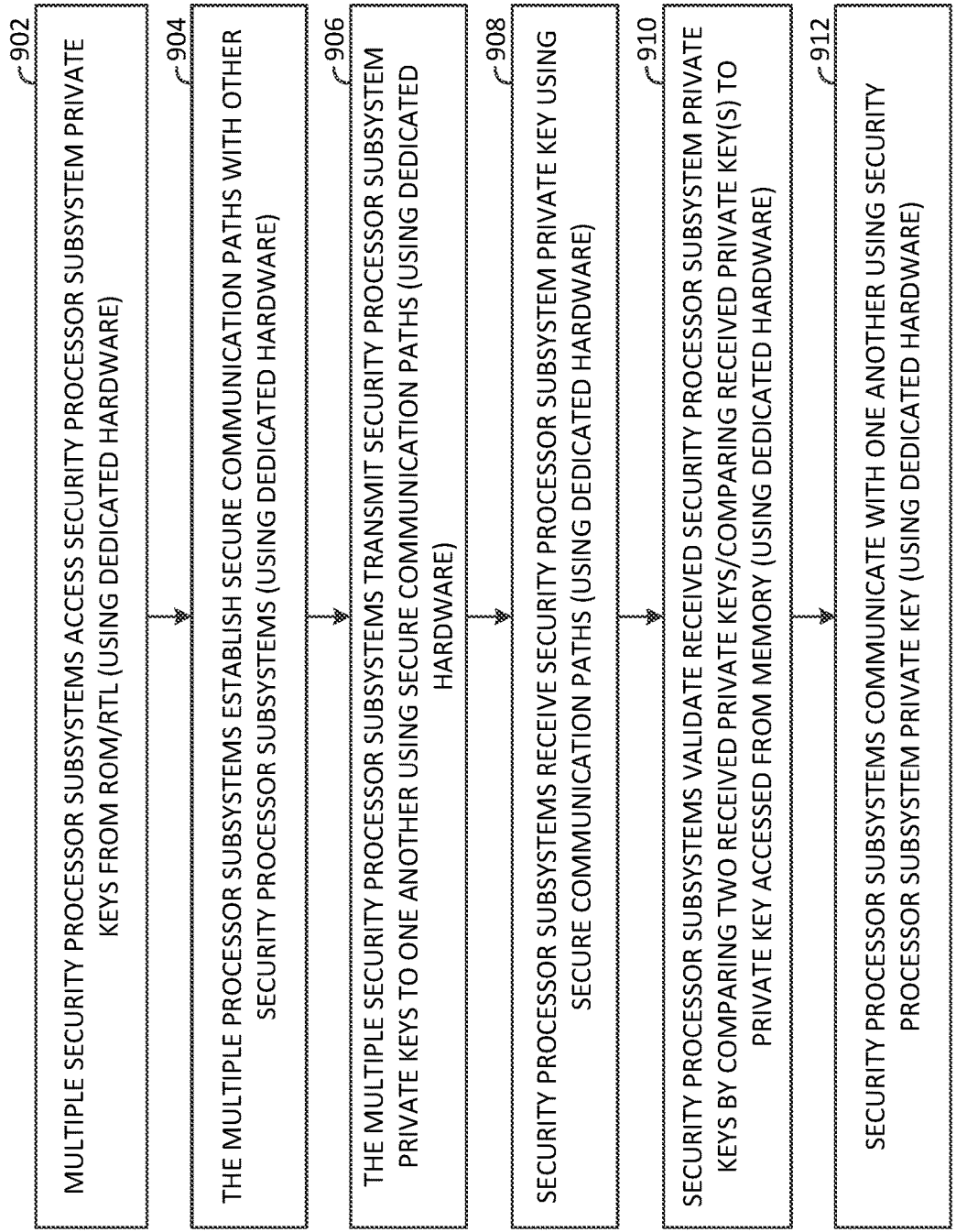
FIG. 9 is a flow diagram illustrating operations of an autonomous driving controller to distribute and validate SCSs private key according to one or more described embodiments.

FIG. 9 is a flow diagram illustrating operations of an autonomous driving controller to distribute and validate SCSs private key according to one or more described embodiments. The operations 900 of FIG. 9 support validation of an SCS private key. Operations 900 begin with multiple SCSs accessing SCS private keys from ROM/RTL (Step 902). Step 902 may be performed using dedicated hardware of the SCSs. Operations continue with multiple SCSs establishing secure communication paths with other SCSs (step 904). Step 904 may be performed consistently with the operations 700 of FIG. 7 and/or use dedicated hardware. Then, the multiple SCSs transmit their respectively accessed SCS private keys to all other of the SCSs using the secure communication paths (Step 906). The other SCSs receive the SCS keys via the secure communication paths (Step 908). The other SCSs then validate the received SCS private keys by comparing all of the SCS private keys they receive to one another (Step 910). With the validation complete, the SCSs communicate with one another using the SCS private key (Step 912). All of these steps 902-912 may be performed using hardware dedicate to the SCS In a simplest implementation, a first and a second SCS access respective SCS private keys that are presumably identical. However, whether these SCS private keys are identical is not known to the SCSs. Thus, each of the first and second SCSs distribute the SCS private key they access to all of the other SCSs. The first SCS receives a SCS private key from the second SCS and compares the received SCS private key to the private key it accessed locally. Likewise, the second SCS receives a SCS private key from the first SCS and compares the received SCS private key to the private key it accessed locally. The other SCSs receive private SCS keys from each of the first SCS and the second SCS and compare the keys they receive to each other. If the SCS private keys compare favorably to one another, the SCS private key distribution is deemed successful. These same techniques may be employed with the SMS private key.

Figure 10:
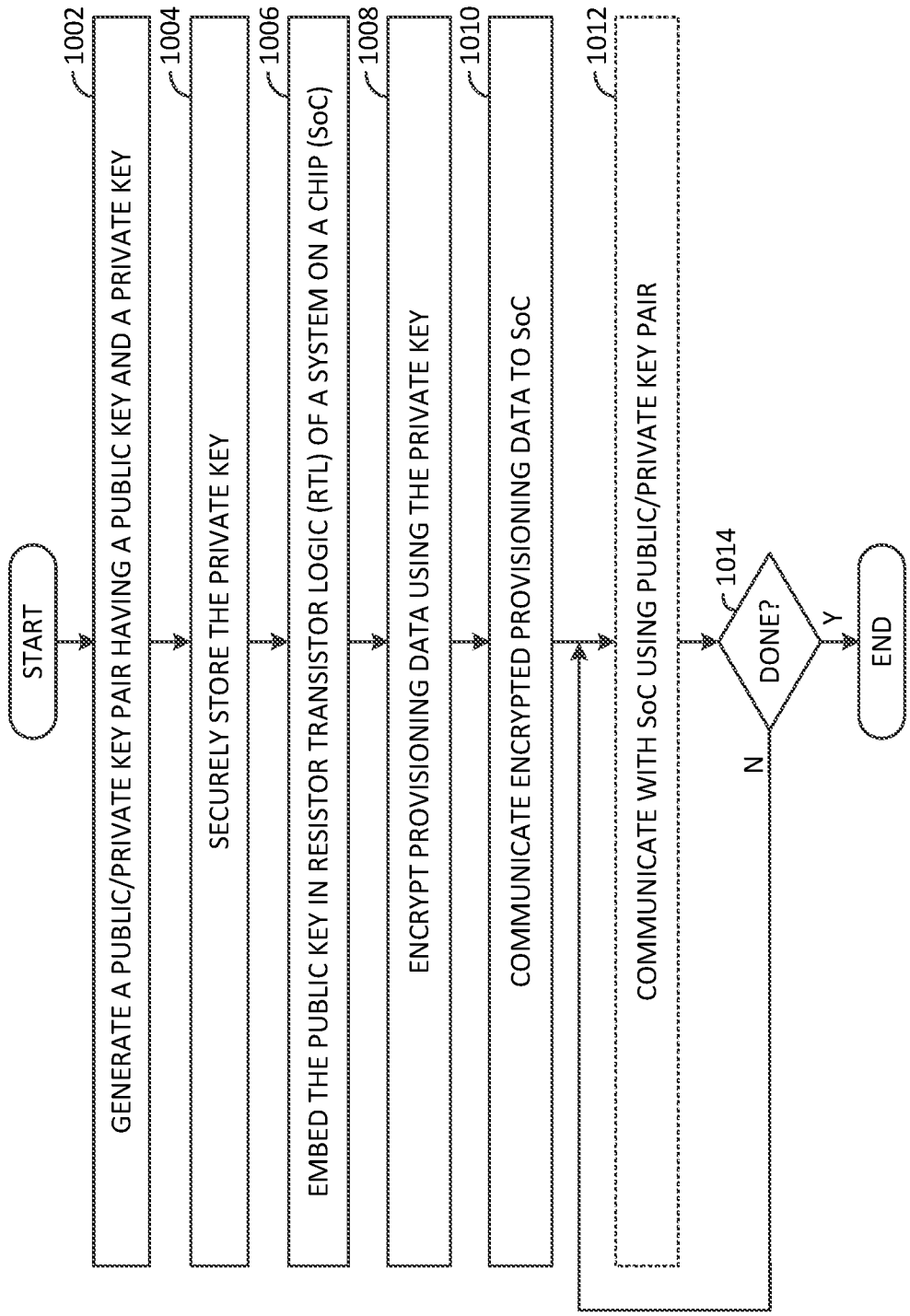
FIG. 10 is a flow diagram illustrating operations of a provisioning device for securely provisioning a SoC according to a described embodiment.

FIG. 10 is a flow diagram illustrating operations of a provisioning device for securely provisioning a SoC according to a described embodiment. Operations 1000 begin with generating a public/private key pair having a public key and a private key (step 1002). Generating the public/private key pair may be performed using an available encryption technique. Step 1002 is performed by a provisioning station or higher order system prior to the manufacture of the SoC. The provisioning station or higher order system then securely stores the private key (step 1004). During manufacture of the SoC, the public key is embedded in the RTL of the SoC (step 1006). The RTL may be the boot ROM of the SoC or another location that is accessible during operation. Operations 1000 continue with a provisioning station encrypting provisioning data using the private key to create encrypted provisioning data (step 1008). Operations 1000 then include communicating the encrypted provisioning data to the SoC to provision the SoC (step 1010).

Operations 1000 optionally include the provisioning station communicating further with the SoC using the public/private key pair (step 1012). The operations of step 1012 continue until completed, as determined at step 1014. When communications between the provisioning station and the SoC are completed, operation ends. The communications of steps 1010 and 1012 may be between the provisioning station and an SCS (or SMS) of the SoC.

Operations 1000 may optionally further include generating a secret shared key, e.g., using Advanced Encryption Standard (AES) operations, embedding the secret shared key in the RTL of the SoC during manufacture of the SoC, and encrypting the provisioning data using the secret shared key. With this optional methodology, operations may further include receiving an encrypted communication from the SoC and using the secret shared key to decrypt the encrypted communication.

Figure 11:
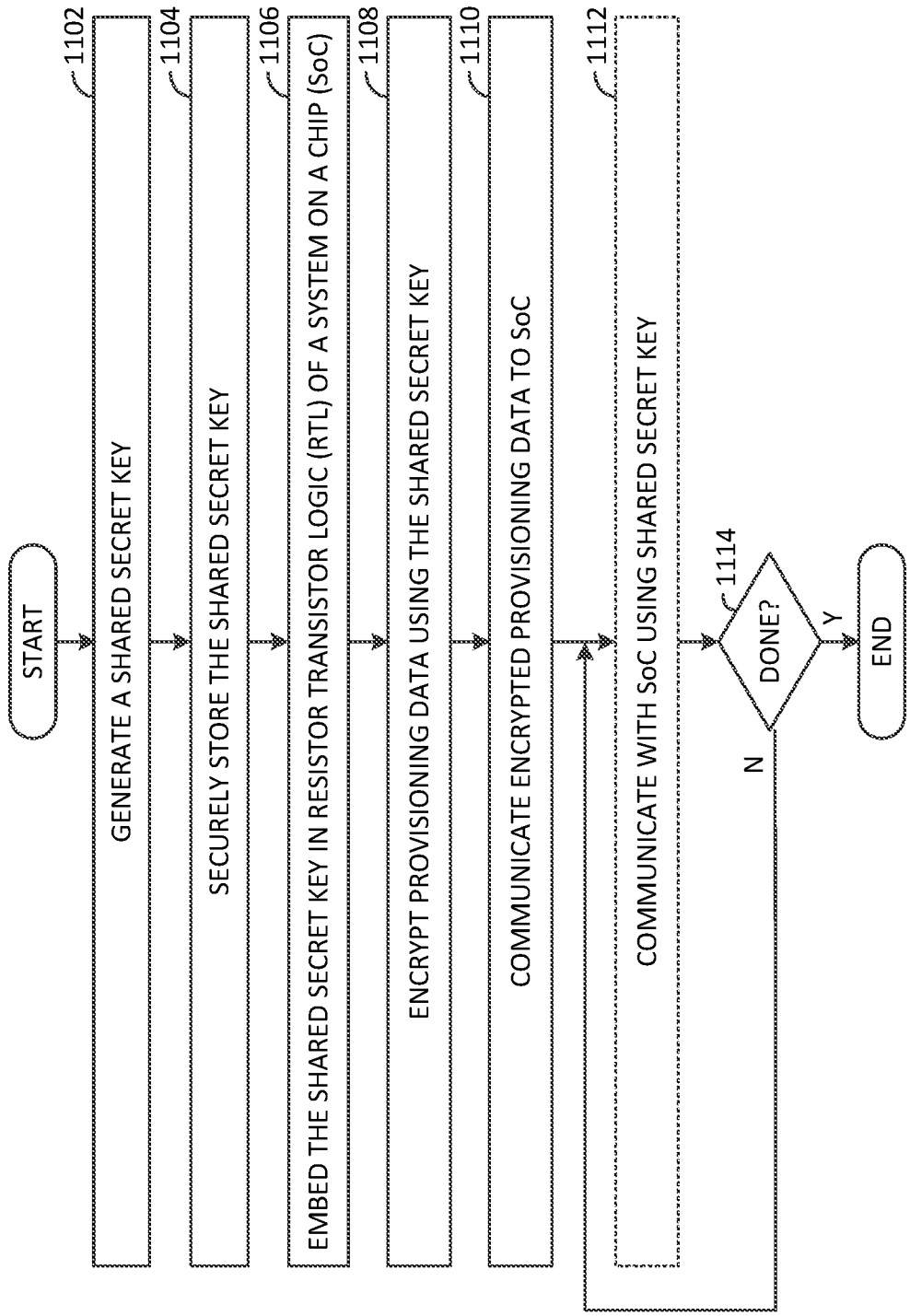
FIG. 11 is a flow diagram illustrating operations of a provisioning device for securely provisioning a SoC according to a described embodiment.

FIG. 11 is a flow diagram illustrating operations of a provisioning device for securely provisioning a SoC according to a described embodiment. Operations 1100 begin with generating a secret shared key, e.g., using Advanced Encryption Standard (AES) operations (step 1102). Step 1102 is performed by a provisioning station or higher order system prior to the manufacture of the SoC. The provisioning station or higher order system then securely stores the secret shared key (step 1104). During manufacture of the SoC, the secret shared key is embedded in the RTL of the SoC (step 1106). The RTL may be the boot ROM of the SoC or another location that is accessible during operation. Operations 1100 continue with a provisioning station encrypting provisioning data using the secret shared key to create encrypted provisioning data (step 1108). Operations 1100 then include communicating the encrypted provisioning data to the SoC to provision the SoC (step 1110).

Operations 1100 optionally include the provisioning station communicating further with the SoC using the secret shared key (step 1112). The operations of step 1112 continue until completed, as determined at step 1114. When communications between the provisioning station and the SoC are completed, operation ends. The communications of steps 1110 and 1112 may be between the provisioning station and an SCS (or SMS) of the SoC.

Figure 12:
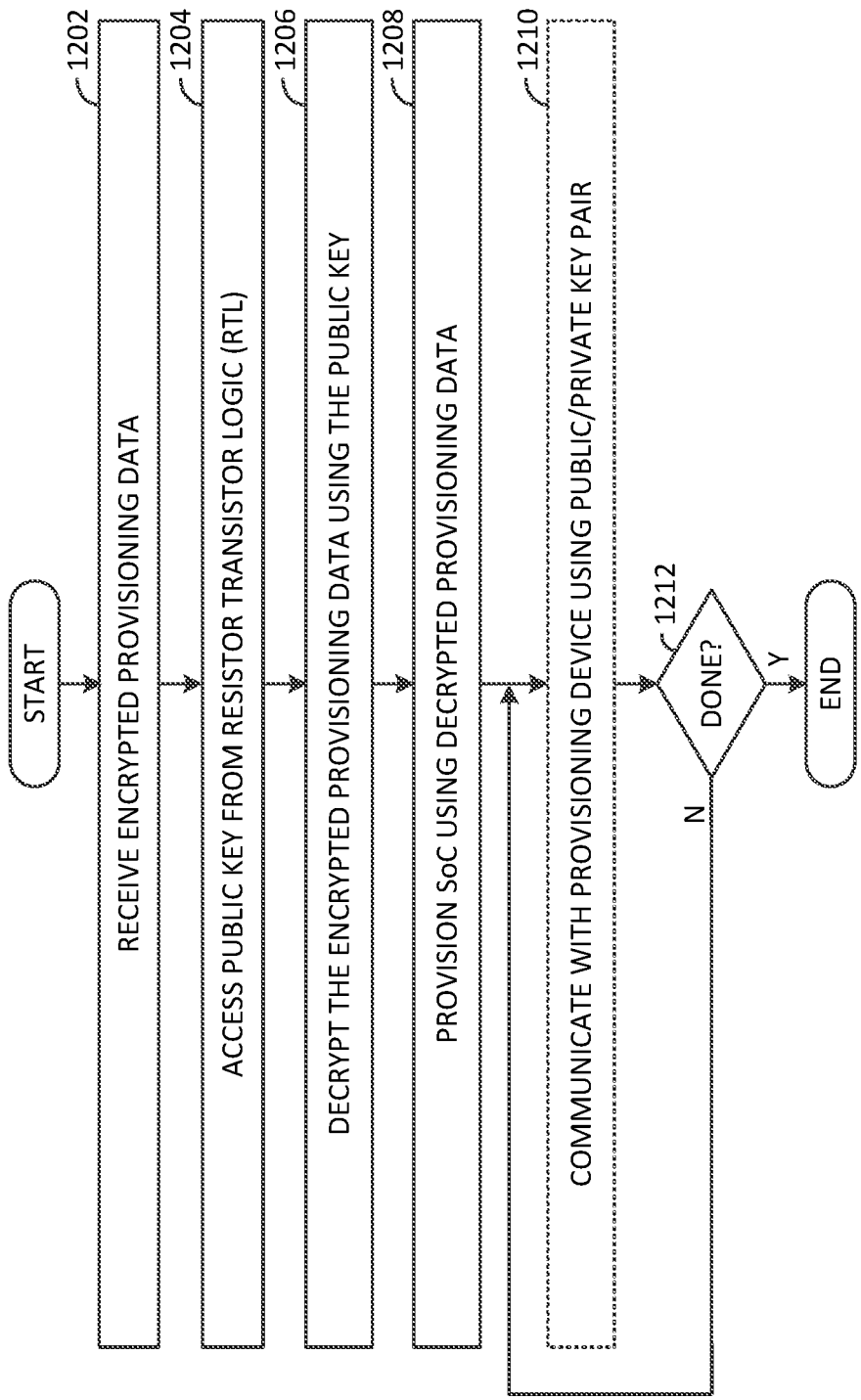
FIG. 12 is a flow diagram illustrating operations of an SoC during its secure provisioning according to a described embodiment.

FIG. 12 is a flow diagram illustrating operations of an SoC during its secure provisioning according to a described embodiment. Operations 1200 begin with the SoC receiving encrypted provisioning data (step 1202). Operations 1200 continue with the SoC accessing a public key from its RTL (step 1204). Operations continue with the SoC decrypting the encrypted provisioning data using the public key to create decrypted provisioning data (step 1206). Operations 1200 then include the SoC provisioning itself using the decrypted provisioning data (step 1208). The operations 1202-1208 may be performed by an SCS (or SMS) of the SoC.

Operations 1200 optionally include the provisioning station communicating further with the SoC using the public/private key pair (step 1210). The operations of step 1212 continue until completed, as determined at step 1212. When communications between the provisioning station and the SoC are completed, operation ends. The communication operations of step 1210 may be performed by an SCS (or SMS) of the SoC.

The operations 1200 of FIG. 12 may further include accessing, by the SoC, a secret shared key from the RTL of the SoC and decrypting, by the SoC, the encrypted provisioning data further using the secret shared key. Another optional operation includes encrypting, by the SoC, a message using the secret shared key to create an encrypted message and transmitting, by the SoC, the encrypted message.

Figure 13:
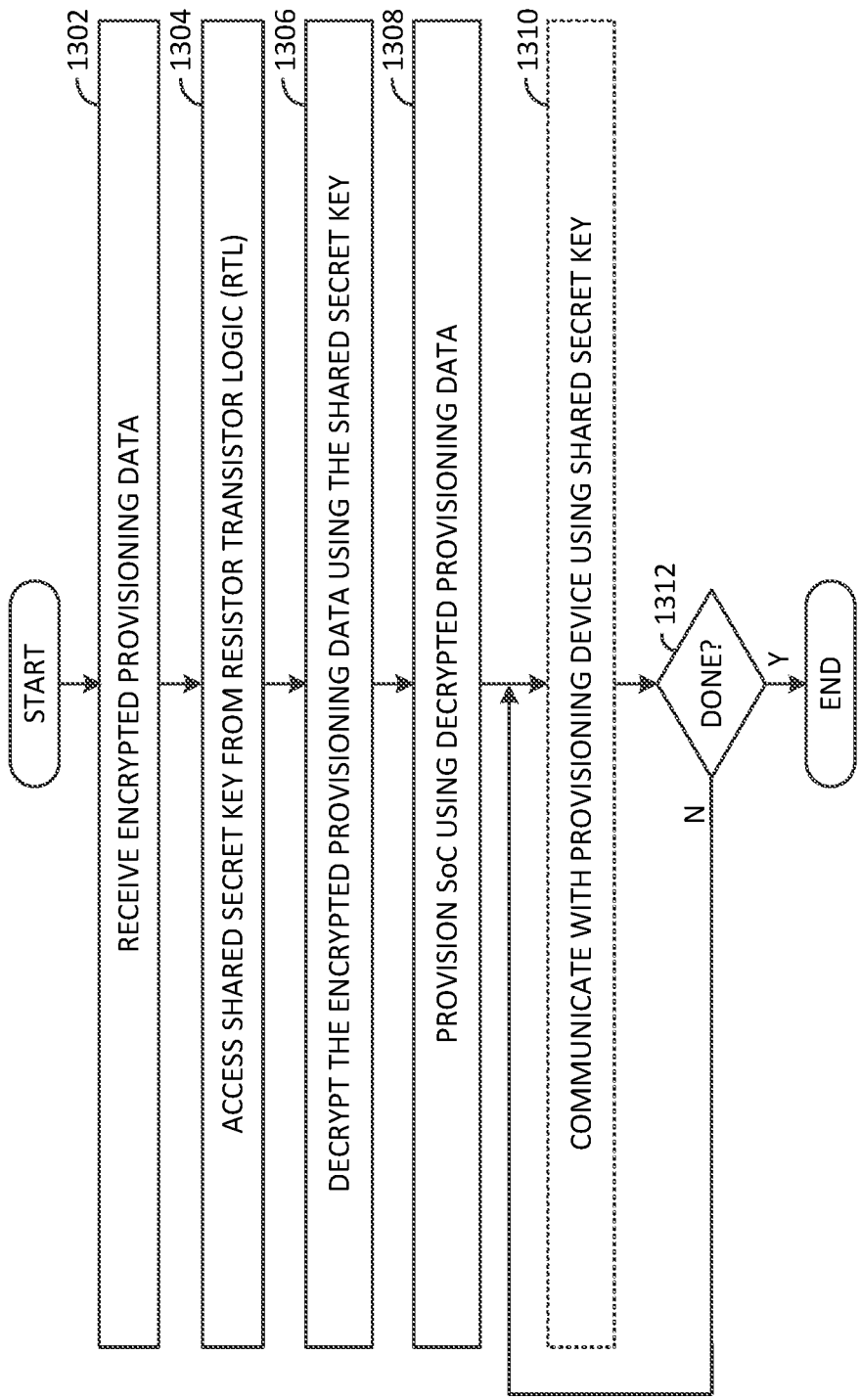
FIG. 13 is a flow diagram illustrating operations of an SoC during its secure provisioning according to a described embodiment.

FIG. 13 is a flow diagram illustrating operations of an SoC during its secure provisioning according to a described embodiment. Operations 1300 begin with the SoC receiving encrypted provisioning data (step 1302). Operations 1300 continue with the SoC accessing a secret shared key from its RTL (step 1304). Operations continue with the SoC decrypting the encrypted provisioning data using the secret shared key to create decrypted provisioning data (step 1306). Operations 1300 then include the SoC provisioning itself using the decrypted provisioning data (step 1308). The operations 1302-1308 may be performed by an SCS (or SMS) of the SoC.

Operations 1300 optionally include the provisioning station communicating further with the SoC using the secret shared key (step 1310). The operations of step 1310 continue until completed, as determined at step 1312. When communications between the provisioning station and the SoC are completed, operation ends. The communication operations of step 1310 may be performed by an SCS (or SMS) of the SoC.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A method for securely provisioning a System on a Chip (SoC), the method comprising:
   generating a public/private key pair having a public key and a private key;
   securely storing the private key external to the SoC;
   embedding the public key in Resistor Transistor Logic (RTL) of the SoC during manufacture of the SoC;
   encrypting provisioning data using the private key to create encrypted provisioning data; and
   programming the SoC using the encrypted provisioning data,
   wherein the SoC comprises a plurality of processors, wherein the processors comprise respective security processor subsystems, wherein the security processor subsystems are configured to authorize rights of communication with components external to the processors and are configured to grant authorization of an operation based on agreement of the security processor subsystems regarding the authorization, wherein programming the SoC using the encrypted provisioning data includes transmitting the encrypted provisioning data to, at least, a first of the security processor subsystems.

2. The method of claim 1, further comprising:
   generating a secret shared key;

embedding the secret shared key in the RTL of the SoC during manufacture of the SoC; and encrypting the provisioning data using the secret shared key.

3. The method of claim 2, further comprising:

receiving an encrypted communication from the SoC; and using the secret shared key to decrypt the encrypted communication.

4. A method for securely provisioning a System on a Chip (SoC), the method comprising:

generating a secret shared key;

securely storing the secret shared key external to the SoC;

embedding the secret shared key in Resistor Transistor Logic (RTL) of the SoC during manufacture of the SoC;

encrypting provisioning data using the secret shared key to create encrypted provisioning data; and programming the SoC using the encrypted provisioning data, wherein programming the SoC using the encrypted provisioning data includes transmitting the encrypted provisioning data to a safety processor subsystem (SMS) of the SoC, wherein the SoC includes a plurality of parallel processors, wherein each parallel processor implements a convolutional neural network (CNN) engine, wherein the SMS is configured to configured to determine whether respective outputs associated with the parallel processors are in agreement, and wherein the parallel processors operate on the same input data.

5. The method of claim 4, further comprising:

receiving an encrypted communication from the SoC; and using the secret shared key to decrypt the encrypted communication.

6. The method of claim 4, wherein programming the SoC using the encrypted provisioning data includes transmitting the encrypted provisioning data to a security processor subsystem (SCS) of the SoC.

7. A method for securely provisioning a System on a Chip (SoC), the method comprising:

receiving, by the SoC, encrypted provisioning data;

accessing, by the SoC, a public key from Resistor Transistor Logic (RTL) of the SoC; and decrypting the encrypted provisioning data using the public key to create decrypted provisioning data, wherein the SoC comprises a plurality of processors, wherein the processors comprise respective security processor subsystems, wherein the security processor subsystems are configured to authorize rights of communication with components external to the processors and are configured to grant authorization of an operation based on agreement of the security processor subsystems regarding the authorization, wherein decrypting the encrypted provisioning data is performed via, at least, a first of the security processor subsystems.

8. The method of claim 7, further comprising the SoC provisioning its operation using the decrypted provisioning data.

9. The method of claim 7, further comprising:

accessing, by the SoC, a secret shared key from the RTL of the SoC; and decrypting, by the SoC, the encrypted provisioning data further using the secret shared key.

10. The method of claim 9, further comprising:

encrypting, by the SoC, a message using the secret shared key to create an encrypted message; and transmitting, by the SoC, the encrypted message.

11. A method for securely provisioning a System on a Chip (SoC), the method comprising:

receiving, by the SoC, encrypted provisioning data;

accessing, by the SoC, a secret shared key from Resistor Transistor Logic (RTL) of the SoC; and decrypting the encrypted provisioning data using the secret shared key to create decrypted provisioning data, wherein the SoC comprises a plurality of processors, wherein the processors comprise respective security processor subsystems, wherein the security processor subsystems are configured to authorize rights of communication with components external to the processors and are configured to grant authorization of an operation based on agreement of the security processor subsystems regarding the authorization, wherein decrypting the encrypted provisioning data is performed via, at least, a first of the security processor subsystems.

12. The method of claim 11, further comprising the SoC provisioning its operation using the decrypted provisioning data.

13. The method of claim 11, further comprising:

encrypting, by the SoC, a message using the secret shared key to create an encrypted message; and transmitting, by the SoC, the encrypted message.

14. A System on a Chip (SoC) comprising:

a plurality of processors, wherein the processors comprise respective security processor subsystems, wherein the security processor subsystems are configured to authorize rights of communication with components external to the processors and are configured to grant authorization of an operation based on agreement of the security processor subsystems regarding the authorization;

memory;

communication circuitry; and a first security processor subsystem of the security processor subsystems, wherein the first security processor subsystem is configured to:

receive, via the communication circuitry, encrypted provisioning data;

access a public key from Resistor Transistor Logic (RTL) of the SoC; and decrypt the encrypted provisioning data using the public key to create decrypted provisioning data.

15. The SoC of claim 14, wherein the first security processor subsystem and at least one of the plurality of processors are configured to provision the SoC using the decrypted provisioning data.

16. The SoC of claim 14, wherein the first security processor subsystem is further configured to:

encrypt a message using the public key to create an encrypted message; and transmit the encrypted message via the communication circuitry.

17. A System on a Chip (SoC) comprising:

a plurality of processors, wherein the processors comprise respective security processor subsystems, wherein the security processor subsystems are configured to authorize rights of communication with components external to the processors and are configured to grant authorization of an operation based on agreement of the security processor subsystems regarding the authorization;

memory;

communication circuitry; and a first security processor subsystem of the security processor subsystems, wherein the first security processor subsystem is configured to:
receive, via the communication circuitry, encrypted provisioning data;
access a secret shared key from Resistor Transistor Logic (RTL) of the SoC; and
decrypt the encrypted provisioning data using the secret shared key to create decrypted provisioning data.

18. The SoC of claim 17, wherein the first security processor subsystem and at least one of the plurality of processors are configured to provision the SoC using the decrypted provisioning data.

19. The SoC of claim 17, wherein the first security processor subsystem is further configured to:
encrypt a message using the secret shared key to create an encrypted message; and
transmit the encrypted message via the communication circuitry.

* * * * *